(12) United States Patent
Lee et al.

(10) Patent No.: US 9,959,863 B2
(45) Date of Patent: May 1, 2018

(54) KEYWORD DETECTION USING SPEAKER-INDEPENDENT KEYWORD MODELS FOR USER-DESIGNATED KEYWORDS

(71) Applicant: QUALCOMM Incorporated, San Diego, CA (US)

(72) Inventors: Minsub Lee, Suwon (KR); Taesu Kim, Suwon (KR); Sungrack Yun, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 14/479,708

(22) Filed: Sep. 8, 2014

(65) Prior Publication Data

US 2016/0071516 A1    Mar. 10, 2016

(51) Int. Cl.
*G10L 15/04*        (2013.01)
*G10L 15/02*        (2006.01)
(Continued)

(52) U.S. Cl.
CPC .............. *G10L 15/18* (2013.01); *G10L 15/30* (2013.01); *G10L 15/06* (2013.01); *G10L 2015/088* (2013.01)

(58) Field of Classification Search
CPC ....... G10L 15/18; G10L 15/30; G10L 15/083; G10L 15/063; G10L 15/26; G10L 15/08;
(Continued)

(56) References Cited

U.S. PATENT DOCUMENTS 5,895,447 A * 4/1999 Ittycheriah .............. G10L 15/07
                                                704/231
6,487,530 B1    11/2002 Lin et al.
(Continued)

FOREIGN PATENT DOCUMENTS

EP        0945851 A2    9/1999
EP        1215661 A1    6/2002
(Continued)

OTHER PUBLICATIONS

International Search Report and Written Opinion for International Application No. PCT/US2015/045661, ISA/EPO, dated Feb. 10, 2016, 20 pages.

(Continued)

*Primary Examiner* — Chan Park
*Assistant Examiner* — Stephen Brinich
(74) *Attorney, Agent, or Firm* — Toler Law Group, P.C.

(57) ABSTRACT

A method, which is performed by an electronic device, for obtaining a speaker-independent keyword model of a keyword designated by a user is disclosed. The method may include receiving at least one sample sound from the user indicative of the keyword. The method may also generate a speaker-dependent keyword model for the keyword based on the at least one sample sound, send a request for the speaker-independent keyword model of the keyword to a server in response to generating the speaker-dependent keyword model, and receive the speaker-independent keyword model adapted for detecting the keyword spoken by a plurality of users from the server.

22 Claims, 14 Drawing Sheets

(51) Int. Cl.
 *G10L 15/18* (2013.01)
 *G10L 15/30* (2013.01)
 *G10L 15/08* (2006.01)
 *G10L 15/06* (2013.01)

(58) Field of Classification Search
 CPC ....... G10L 15/00; G10L 15/065; G10L 15/07; G10L 15/20; G10L 2015/088; G10L 15/142; H04M 1/271; H04M 2201/40
 USPC ...... 704/1–10, 251, 246, 231, 235, E15.047, 704/275, 270, 270.1, 255, 244
 See application file for complete search history.

(56) References Cited

U.S. PATENT DOCUMENTS

| | | | |
|---|---|---|---|
| 6,766,295 B1 * | 7/2004 | Murveit | G10L 15/30 379/88.01 |
| 2002/0065656 A1 * | 5/2002 | Reding | G10L 15/30 704/244 |
| 2002/0143540 A1 * | 10/2002 | Malayath | G10L 15/07 704/255 |
| 2005/0010412 A1 | 1/2005 | Aronowitz | |
| 2008/0228480 A1 | 9/2008 | Maegawa | |
| 2009/0055185 A1 | 2/2009 | Nakade et al. | |
| 2009/0210226 A1 | 8/2009 | Ma | |
| 2010/0145696 A1 | 6/2010 | Huang et al. | |
| 2011/0119059 A1 | 5/2011 | Ljolje et al. | |
| 2014/0163977 A1 | 6/2014 | Hoffmeister et al. | |

FOREIGN PATENT DOCUMENTS

| | | |
|---|---|---|
| EP | 1349146 A1 | 10/2003 |
| EP | 2169669 A1 | 3/2010 |

OTHER PUBLICATIONS

Partial International Search Report—PCT/US2015/045661—ISA/EPO—Oct. 29, 2015, 6 pages.

* cited by examiner

KEYWORD DETECTION USING SPEAKER-INDEPENDENT KEYWORD MODELS FOR USER-DESIGNATED KEYWORDS

TECHNICAL FIELD

The present disclosure relates generally to speech recognition in electronic devices, and more specifically, to detecting a keyword based on at least one of a speaker-dependent keyword model and a speaker-independent keyword model.

BACKGROUND

Recently, the use of electronic devices such as smartphones, tablet computers, and smart TVs, and the like has become widespread. These devices often provide voice and/or data communication functionalities over wireless or wired networks. In addition, such devices may include other features for providing a variety of functions designed to enhance user convenience such as sound processing, image or video processing, navigation, reproduction of music or multimedia files, etc.

Among such features, conventional electronic devices are often equipped with a speech recognition function. Such a function allows an electronic device to perform various functions when a voice command from a user is recognized. For example, the electronic device may activate an application, play an audio file, or take a picture in response to the voice command from the user.

Some electronic devices may be used by a plurality of users. For example, a smart TV or a tablet computer may be used by a plurality of family members. Such electronic devices may be operated in response to voice commands by the users. These electronic devices are often equipped with a limited number of pre-defined keywords that may be used in detecting the keywords from a plurality of users. Due to the limited number of such keywords, the electronic devices may also allow a user to define a keyword for a voice command to perform a specific function of the electronic devices. However, using such a keyword defined by the user may not be suitable for recognizing the keyword in a voice command by another user due to a difference in voice characteristics or pronunciation of the users.

SUMMARY

The present disclosure provides methods and apparatus for obtaining a speaker-independent keyword model of a keyword designated by a user.

According to one aspect of the present disclosure, a method, which is performed by an electronic device, for obtaining a speaker-independent keyword model of a keyword designated by a user is disclosed. The method may include receiving at least one sample sound from the user indicative of the keyword. The method may also generate a speaker-dependent keyword model for the keyword based on the at least one sample sound, send a request for the speaker-independent keyword model of the keyword to a server in response to generating the speaker-dependent keyword model, and receive the speaker-independent keyword model adapted for detecting the keyword spoken by a plurality of users. This disclosure also describes a device relating to this method.

According to another aspect of the present disclosure, an electronic device may include a sound sensor and a keyword model generator. The sound sensor may be configured to receive at least one sample sound indicative of a keyword designated by a user. Further, the keyword model generator may be configured to generate a speaker-dependent keyword model for the keyword based on the at least one sample sound. In addition, the electronic device may be configured to send a request for a speaker-independent keyword model of the keyword to a server in response to generating the speaker-dependent keyword model, and receive the speaker-independent keyword model f adapted for detecting the keyword spoken by a plurality of users from the server.

According to still another aspect of the present disclosure, a method, which is performed by a server, for identifying a speaker-independent keyword model associated with a keyword designated by a user is disclosed. The method may include receiving a request to provide the speaker-independent keyword model associated with the keyword from an electronic device. The method may also determine whether a plurality of speaker-independent keyword models associated with a plurality of keywords includes the speaker-independent keyword model associated with the keyword. The plurality of speaker-independent keyword models may be adapted for detecting the plurality of keywords spoken by a plurality of users. Further, the method may include providing the speaker-independent keyword model to the electronic device upon determining that the plurality of speaker-independent keyword models includes the speaker-independent keyword model, and adding the keyword to a list of unidentified keywords upon determining that the plurality of speaker-independent keyword models does not include the speaker-independent keyword model. This disclosure also describes a device relating to this method.

According to still another aspect of the present disclosure a server may include a communication unit and a keyword matching unit. The communication unit may be configured to receive a request to provide a speaker-independent keyword model associated with a keyword designated by a user from an electronic device. Further, the keyword matching unit may be configured to determine whether a plurality of speaker-independent keyword models associated with a plurality of keywords includes the speaker-independent keyword model associated with the keyword, and add the keyword to a list of unidentified keywords upon determining that the plurality of speaker-independent keyword models does not include the speaker-independent keyword model. The plurality of speaker-independent keyword models may be adapted for detecting the plurality of keywords spoken by a plurality of users. In addition, the server may be configured to provide the speaker-independent keyword model to the electronic device upon determining that the plurality of speaker-independent keyword models includes the speaker-independent keyword model.

BRIEF DESCRIPTION OF THE DRAWINGS

Embodiments of the inventive aspects of this disclosure will be understood with reference to the following detailed description, when read in conjunction with the accompanying drawings.

DETAILED DESCRIPTION

Reference will now be made in detail to various embodiments, examples of which are illustrated in the accompanying drawings. In the following detailed description, numerous specific details are set forth in order to provide a thorough understanding of the present subject matter. However, it will be apparent to one of ordinary skill in the art that the present subject matter may be practiced without these specific details. In other instances, well-known methods, procedures, systems, and components have not been described in detail so as not to unnecessarily obscure aspects of the various embodiments.

Figure 1:
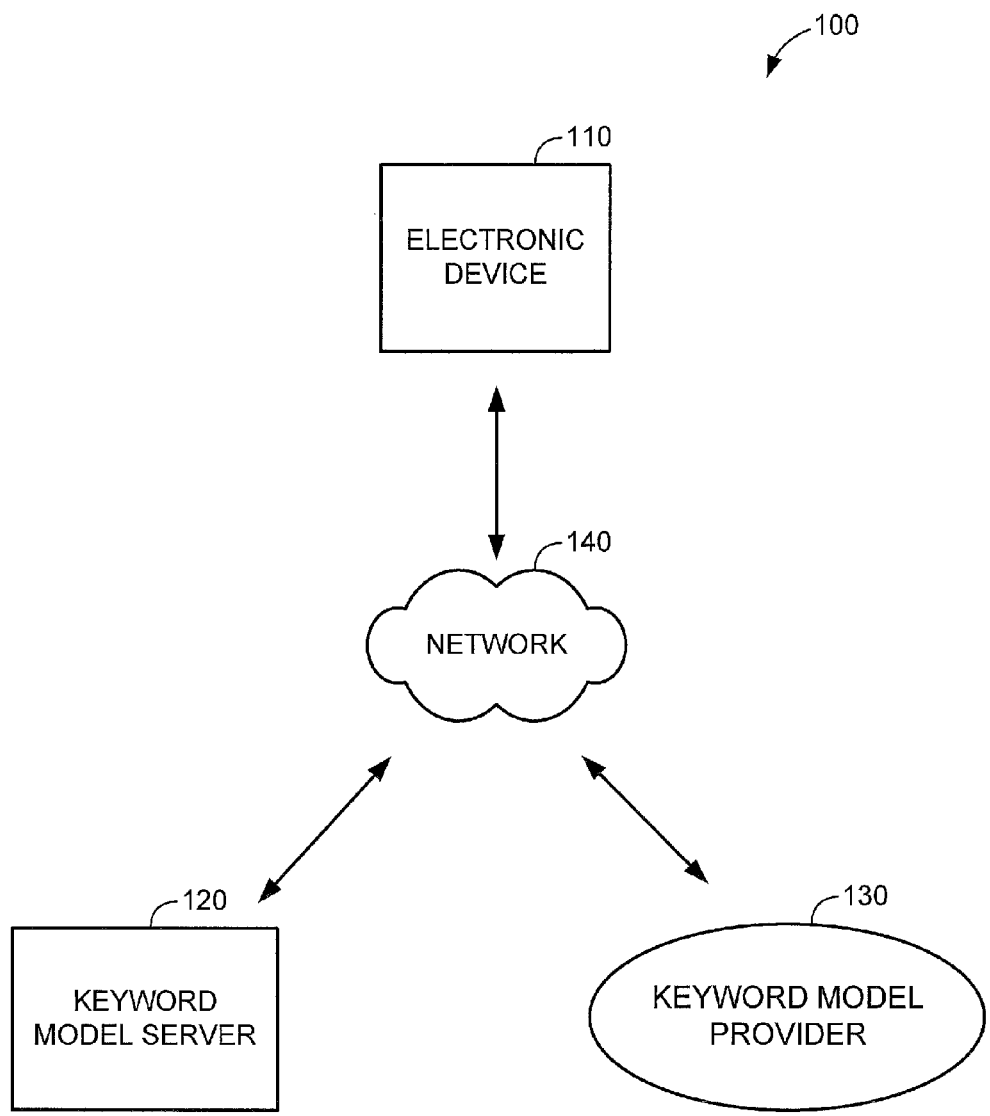
FIG. 1 illustrates a system for providing a speaker-independent keyword model associated with a keyword, which may be designated by a user, for use in detecting the keyword from an input speech or sound by an electronic device, according to one embodiment of the present disclosure.

FIG. 1 illustrates a system 100 for providing a speaker-independent keyword model associated with a keyword, which may be designated by a user, for use in detecting the keyword from an input speech or sound by an electronic device 110, according to one embodiment of the present disclosure. The system 100 may include the electronic device 110, a keyword model server 120, and a keyword model provider 130, which may be configured to communicate via a communication network 140. The electronic device 110 may be any suitable device equipped with sound capturing and processing capabilities such as a cellular phone, a smartphone, a laptop computer, a wearable computer, a tablet device, a gaming device, a multimedia player, a smart TV, etc. Although FIG. 1 illustrates the electronic device 110, the system 100 may include any suitable number of such electronic devices communicating with the keyword model server 120 via the communication network 140.

As used herein, the term "keyword" may refer to any digital or analog signal or data indicative of one or more words or sound that can be used to perform or activate a function or an application in the electronic device 110. If such a keyword is detected from an input speech or sound by the electronic device 110, a function (e.g., a feature, an application, etc.) associated with the keyword may be performed or activated in the electronic device 110. For example, when a keyword "HI ASSISTANT" is detected from an input speech, the electronic device 110 may activate a voice assistant application associated with the keyword.

The electronic device 110 may be configured to detect a keyword from an input speech or sound by using a keyword model. A keyword model may include information on a keyword (e.g., a text string or one or more words of the keyword) to be detected by the keyword model, a plurality of keyword model parameters, and a threshold value. In one embodiment, the keyword model parameters may be indicative of sound characteristics of the associated keyword, and may include state information on a plurality of states associated with a plurality of portions of the keyword, and a probability model for determining a confidence score for an input sound indicative of a probability that the input sound includes the keyword. The threshold value may be a minimum value for determining that an input sound includes the associated keyword.

The keyword model may be a speaker-independent keyword model and a speaker-dependent keyword model. As used herein, a "speaker-independent keyword model" may be associated with a keyword for use in detecting the keyword spoken by any user irrespective of who the user is and may refer to a keyword model trained with a large number (e.g., several thousands) of sample sounds indicative of the keyword and/or non-keywords that may be spoken by a large number of users. The term "sample sound" may refer to a sequence of one or more sound signals or sound data indicating a keyword or the like. Due to the speaker-independent characteristics, the speaker-independent keyword model may be used in detecting the keyword from utterances of different speakers with high accuracy.

On the other hand, a "speaker-dependent keyword model" may be associated with a keyword for use in detecting the keyword spoken by a specific user and may refer to a keyword model trained with a small number (e.g., five) of sample sounds indicative of the keyword spoken by the specific user. Due to the speaker-dependent characteristics, while the speaker-dependent keyword model may be useful in detecting the keyword from utterances spoken by the specific user, it may not be well suited for detecting the keyword from utterances of users other than the specific user. In one embodiment, the speaker-dependent keyword model may include a first threshold value for detecting the keyword from an input sound and a second threshold value for detecting the keyword spoken by users other than the specific user. In this case, the second threshold value may be smaller than the first threshold value.

The keyword model provider 130 may generate a speaker-independent keyword model for a keyword that is trained based on a large number of sample sounds indicative of the keyword and/or non-keywords spoken by a large number of users. The speaker-independent keyword model trained in such a manner may be optimized for detecting the associated keyword from different users. The keyword model provider 130 may be a dedicated keyword model provider that is capable of providing a variety of speaker-independent keyword models for various keywords. One or more generated speaker-independent keyword models may be uploaded to the keyword model server 120 via the communication network 140.

The keyword model server 120 may store, as a database, a plurality of speaker-independent keyword models for a plurality of keywords including one or more speaker-independent keyword models received from the keyword model provider 130. In some embodiments, the keyword model server 120 may be configured to host an online store for providing speaker-independent keyword models to various types of electronic devices including the electronic device 110 via the communication network 140. The online store may be a dedicated store for providing the speaker-independent keyword models or may be implemented as a part of a general application store.

In some embodiments, a user of the electronic device 110 may generate a speaker-dependent keyword model for a keyword designated by the user by speaking the keyword several times (e.g., speaking "HI ASSISTANT" 5 times) as sample sounds. As used herein, the phrases "a keyword designated by a user" and "a user-designated keyword" are used interchangeably and may refer to one or more words or terms that may be designated, assigned, selected, identified, or defined as a keyword by a user. Upon generating the speaker-dependent keyword model, the electronic device 110 may send a request for a speaker-independent keyword model associated with the user-designated keyword to the keyword model server 120 via the communication network 140. In one embodiment, the request may include at least one of the user-designated keyword, at least one sample sound for the keyword, at least one sound feature extracted from the at least one sample sound, and the speaker-dependent keyword model generated by the electronic device 110. In the case of the user-designated keyword, the keyword in the request may be a text string or one or more words.

Upon receiving the request from the electronic device 110, the keyword model server 120 may search the database of the plurality of speaker-independent keyword models to find a speaker-independent keyword model associated with the user-designated keyword. If the speaker-independent keyword model is found, the keyword model server 120 may provide the speaker-independent keyword model to the electronic device 110 via the communication network 140. Once the speaker-independent keyword model is received, the electronic device 110 may use the speaker-independent keyword model in detecting the user-designated keyword from utterances spoken by any user. By using the speaker-independent keyword model rather than the speaker-dependent keyword model, the electronic device 110 may detect the user-designated keyword spoken by different users with high accuracy. In one embodiment, the electronic device 110 may use both the speaker-dependent and speaker-independent keyword models associated with the user-designated keyword for verifying a speaker as the user who provided the sample sounds for generating the speaker-dependent keyword model.

On the other hand, if the keyword model server 120 does not find the speaker-independent keyword model associated with the user-designated keyword, the keyword model server 120 may add the user-designated keyword that may be included in the request to a list of unidentified keywords (e.g., a database of unidentified keywords), which may include one or more unidentified keywords. Alternatively or additionally, the keyword model server 120 may store in the list of unidentified keywords the at least one sample sound for the keyword, the at least one sound feature extracted from the at least one sample sound, and the speaker-dependent keyword model that may be included in the request. In addition, the keyword model server 120 may send a message to the electronic device 110 that no speaker-independent keyword model associated with the keyword is available. In response, the electronic device 110 may use the speaker-dependent keyword model for detecting the user-designated keyword from utterances spoken by users.

The keyword model server 120 may update the database of the plurality of speaker-independent keyword models when a new speaker-independent keyword model is received from the keyword model provider 130. Upon updating the database, the keyword model server 120 may determine whether the new speaker-independent keyword model is associated with an unidentified keyword in the list of unidentified keywords. If the new speaker-independent keyword model is associated with one of the unidentified keywords, the keyword model server 120 may determine an electronic device (e.g., the electronic device 110) that requested the unidentified keyword and provide the new speaker-independent keyword model to the determined electronic device.

As described above, the electronic device 110 may generate a user-dependent keyword model for a user-designated keyword and then send a request to the keyword model server 120 for a user-independent keyword model associated with the keyword. Alternatively, the electronic device 110 may first send a request to the keyword model server 120 for a user-independent keyword model associated with the user-designated keyword. If the user-independent keyword model is not received from the keyword model server 120, a user-dependent keyword model may then be generated. On the other hand, if the user-independent keyword model is received from the keyword model server 120, the electronic device 110 may use the user-independent keyword model to detect the user-designated keyword from an input sound.

Figure 2:
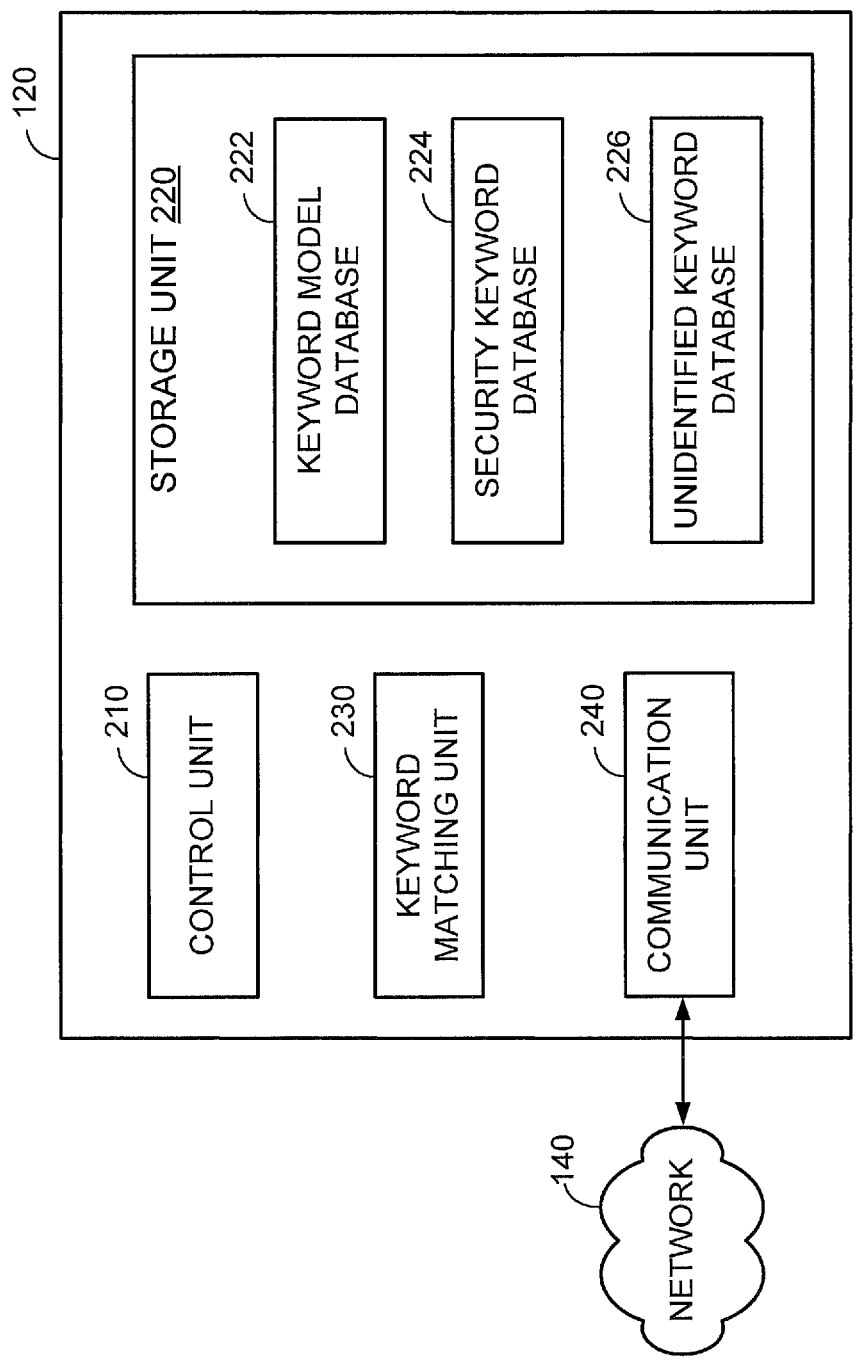
FIG. 2 illustrates a block diagram of a keyword model server configured to identify a speaker-independent keyword model associated with a keyword designated by a user, according to one embodiment of the present disclosure.

FIG. 2 illustrates a block diagram of the keyword model server 120 configured to identify a speaker-independent keyword model associated with a keyword designated by a user, according to one embodiment of the present disclosure. The keyword model server 120 may include a control unit 210, a storage unit 220, a keyword matching unit 230, and a communication unit 240. The control unit 210 may control and manage overall operations of the keyword model server 120. As shown, the storage unit 220 may include a keyword model database 222, a security keyword database 224, and an unidentified keyword database 226. The keyword model server 120 may communicate with the electronic device 110 and the keyword model provider 130 via the communication unit 240 over the communication network 140.

The keyword model database 222 in the storage unit 220 may include a plurality of speaker-independent keyword models for a plurality of keywords. The plurality of speaker-independent keyword models stored in the keyword model database 222 may be adapted for detecting the plurality of keywords spoken by a plurality of users. Further, the security keyword database 224 may include a list of a plurality of private keywords (e.g., "BANKING," "CONTACT," "MESSAGE," "CALENDAR," "E-MAIL," etc.) indicative of a high security level and a plurality of non-private keywords (e.g., "INTERNET," "TV," "RADIO," "WEATHER," "MUSIC," "TIME," etc.) indicative of a low security level. For example, a private keyword may indicate that a function associated with a keyword may be accessed by a specified user. On the other hand, a non-private keyword may indicate that a function associated with a keyword may be accessed by any user. The unidentified keyword database 226 may include a list of unidentified keywords, which may be updated when a speaker-independent keyword model for a user-designated keyword is not found in the keyword model database 222.

In the keyword model server 120, the communication unit 240 may receive a request for a speaker-independent keyword model associated with a user-designated keyword from the electronic device 110 via the communication network 140. In one embodiment, the request may include at least one of the user-designated keyword, at least one sample sound for the user-designated keyword, at least one sound feature extracted from the at least one sample sound, and a speaker-dependent keyword model for the user-designated keyword generated by the electronic device 110. If the user-designated keyword is included in the request, the user-designated keyword may be a text string or one or more words. The communication unit 240 may provide the request to the keyword matching unit 230 upon receiving the request from the electronic device 110.

Upon receiving the request, the keyword matching unit 230 may access the keyword model database 222 to find a speaker-independent keyword model associated with the user-designated keyword. The keyword matching unit 230 may then determine whether the keyword model database 222 includes the speaker-independent keyword model associated with the user-designated keyword. If it is determined that the keyword model database 222 includes the speaker-independent keyword model, the keyword model server 120 may provide the speaker-independent keyword model to the electronic device 110 via the communication unit 240.

In one embodiment, the request may include the user-designated keyword, which may be compared with the plurality of keywords associated with the plurality of speaker-independent keyword models in the keyword model database 222. Based on the comparison, the keyword matching unit 230 may identify a keyword among the plurality of keywords associated with the plurality of speaker-independent keyword models in the keyword model database 222 that matches the user-designated keyword in the request. The speaker-independent keyword model associated with the identified keyword may then be provided to the electronic device 110 via the communication unit 240.

In another embodiment, the request may include one or more sample sounds for the user-designated keyword. In this case, the keyword matching unit 230 may identify a speaker-independent keyword model among the plurality of speaker-independent keyword models in the keyword model database 222 by using at least one of the speaker-independent keyword models to detect or recognize the user-designated keyword in the sample sounds. For example, the keyword matching unit 230 may calculate one or more confidence scores of the sample sounds for each speaker-independent keyword model in the keyword model database 222, and select a speaker-independent keyword model that has the highest confidence score as the speaker-independent keyword model associated with the user-designated keyword. Alternatively, the request may include one or more sound features extracted from the one or more sample sounds. In this case, the keyword matching unit 230 may identify a speaker-independent keyword model by using at least one of the speaker-independent keyword models in the keyword model database 222 to detect or recognize the user-designated keyword in the one or more sound features.

In yet another embodiment, the request may include a speaker-dependent keyword model generated by the electronic device 110. In this case, the keyword matching unit 230 may identify a speaker-independent keyword model in the keyword model database 222 based on a similarity value between the speaker-dependent keyword model and at least one of the plurality of speaker-independent keyword models. For example, the keyword matching unit 230 may calculate a similarity value between a plurality of keyword model parameters in the speaker-dependent keyword model and a plurality of keyword model parameters in each of the speaker-independent keyword models in the keyword model database 222. Based on the similarity values, the keyword matching unit 230 may identify a speaker-independent keyword model that has the highest similarity value as the speaker-independent keyword model associated with the user-designated keyword.

Upon identifying a speaker-independent keyword model for the user-designated keyword, the keyword model server 120 may provide the speaker-independent keyword model to the electronic device 110 via the communication unit 240. In one embodiment, the keyword model server 120 may provide the speaker-independent keyword model to the electronic device 110 immediately upon identifying the speaker-independent keyword model. In another embodiment, the keyword matching unit 230 may determine whether the user-designated keyword includes one or more private keywords (e.g., "BANKING," "CONTACT," "MESSAGE," "CALENDAR," "E-MAIL," etc.) in the security keyword database 224. If the user-designated keyword is determined to include one or more private keywords, the keyword model server 120 may not provide the speaker-independent keyword model to the electronic device 110 for security purposes. For example, if the user-designated keyword is "SHOW MY SCHEDULE," the keyword model server 120 may determine that the user-designated keyword includes a private keyword "SCHEDULE" and thus may send a message to the electronic device 110 that the speaker-independent keyword model is not being sent for security purposes.

Alternatively or additionally, the keyword matching unit 230 may determine whether the user-designated keyword includes one or more non-private keywords (e.g., "INTERNET," "TV," "RADIO," "WEATHER," "MUSIC," "TIME," etc.) in the security keyword database 224. If the user-designated keyword is determined to include one or more non-private keywords, the keyword model server 120 may provide the speaker-independent keyword model to the electronic device 110. For example, if the user-designated keyword is "TURN ON THE TV," the keyword model server 120 may determine that the user-designated keyword includes a non-private keyword "TV" and thus may send the speaker-independent keyword model to the electronic device 110. In some embodiments, it may be predetermined whether the keyword model server 120 may or may not send the speaker-independent keyword model to the electronic device 110 in a case where the user-designated keyword is determined to include both one or more private keywords and one or more non-private keywords.

On the other hand, if the keyword matching unit 230 does not identify or find a speaker-independent keyword model associated with the user-designated keyword in the keyword model database 222, the keyword matching unit 230 may update the unidentified keyword database 226 by adding the user-designated keyword that may be included in the request to a list of unidentified keywords. Alternatively or additionally, the keyword matching unit 230 may update the unidentified keyword database 226 with one or more sample sounds for the user-designated keyword, one or more sound features extracted from the one or more sample sounds, and/or the speaker-dependent keyword model that may be included in the request. Further, the keyword model server 120 may send a message to the electronic device 110 that a speaker-independent keyword model for the keyword is unavailable.

The keyword model server 120 may update the keyword model database 222 with a new speaker-independent keyword model, which may be received from the keyword model provider 130 via the communication unit 240. Upon updating the keyword model database 222, the keyword matching unit 230 may determine whether the new speaker-independent keyword model is associated with an unidentified keyword in the list of unidentified keywords of the unidentified keyword database 226. Alternatively, the keyword matching unit 230 may determine whether the new speaker-independent keyword model is associated with one or more sample sounds, one or more sound features, and/or the speaker-dependent keyword model in the unidentified keyword database 226. If the new speaker-independent keyword model is determined to be associated with any one of the unidentified keyword, one or more sample sounds, one or more sound features, and the speaker-dependent keyword model in the unidentified keyword database 226, the keyword model server 120 may identify an electronic device that sent a request for a speaker-independent keyword model for the unidentified keyword. The keyword model server 120 may then provide the new speaker-independent keyword model to the identified electronic device.

Figure 3:
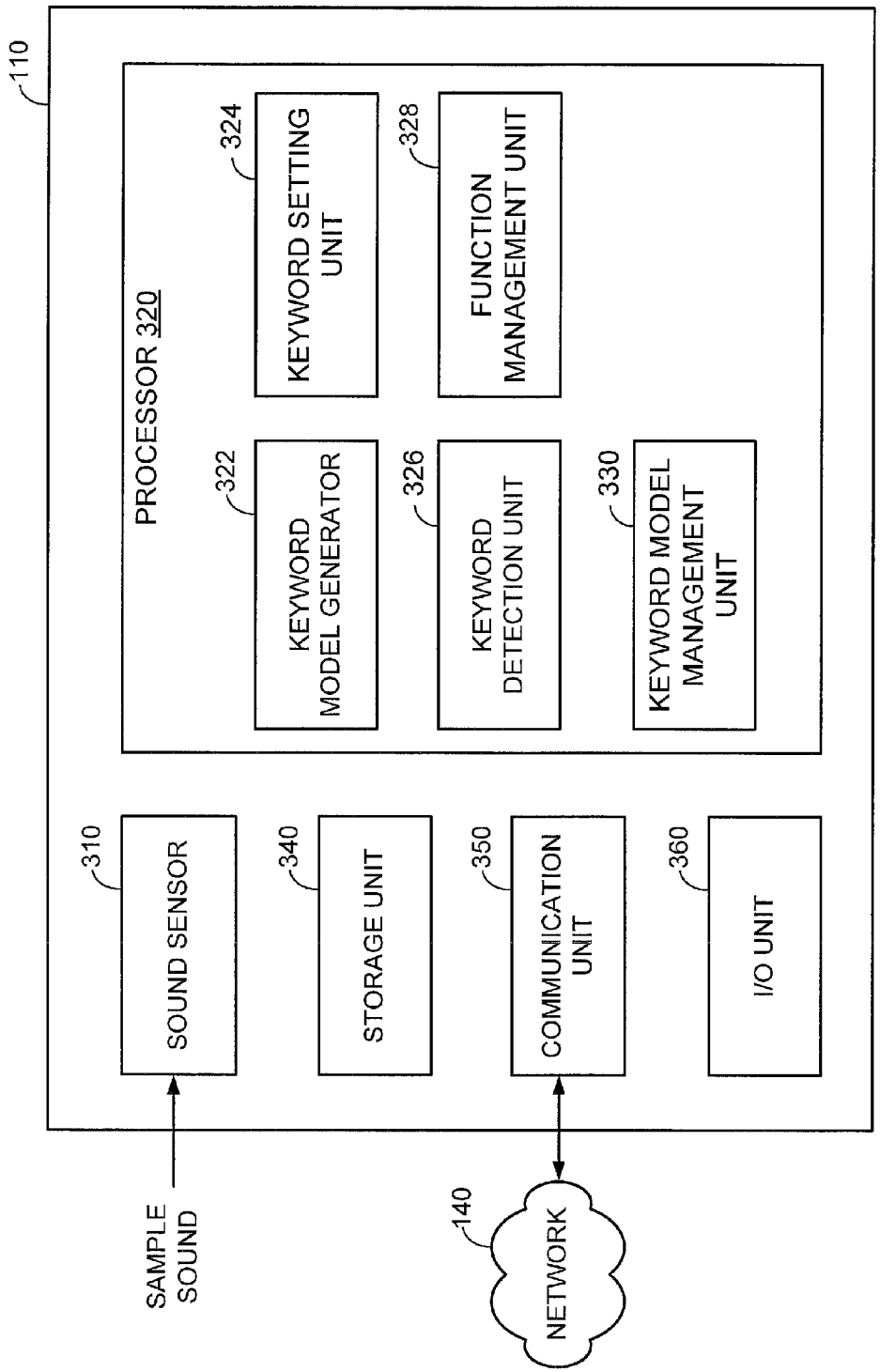
FIG. 3 illustrates a block diagram of an electronic device configured to obtain a speaker-independent keyword model for a keyword designated by a user, according to one embodiment of the present disclosure.

FIG. 3 illustrates a block diagram of the electronic device 110 configured to obtain a speaker-independent keyword model for a keyword designated by a user, according to one embodiment of the present disclosure. The electronic device 110 may include a sound sensor 310, a processor 320, a storage unit 340, a communication unit 350, and an I/O unit 360. The electronic device 110 may be any suitable device equipped with sound capturing and processing capabilities such as a cellular phone, a smartphone, a laptop computer, a wearable computer, a tablet device, a gaming device, a multimedia player, a smart TV, etc. In some embodiments, the electronic device 110 may be operated by a plurality of users based on speech commands that may include one or more keywords designated by the users. For example, a family member may designate a keyword for operating a smartphone or a smart TV and other family members may also use the designated keyword to operate the smartphone or the smart TV. In these cases, speaker-independent keyword models may be better suited for detecting keywords from utterances spoken by different users than speaker-dependent keyword models.

As shown, the processor 320 may include a keyword model generator 322, a keyword setting unit 324, a keyword detection unit 326, a function management unit 328, and a keyword model management unit 330. The processor 320 may be any suitable processor for managing and operating the electronic device 110, such as an application processor (AP), central processing unit (CPU), digital signal processor (DSP), or the like. The keyword model generator 322, keyword setting unit 324, keyword detection unit 326, function management unit 328, and keyword model management unit 330 in the processor 320 may be implemented as one or more software modules or components, hardware units or components, and/or any combination thereof.

In some embodiments, a user of the electronic device 110 may designate a keyword for a speech command via the sound sensor 310. In addition, the user may input text for the keyword (e.g., a text string or one or more words of the keyword) via the I/O unit 360 such as a keyboard or a touch screen. For example, the user may input one or more sample sounds (e.g., uttering the keyword 5 times) for the keyword via the sound sensor 310 and provide the text for the keyword via the I/O unit 360. The sound sensor 310 may include one or more microphones or any other types of sound sensors that can be used to receive, capture, sense, recognize and/or detect speech input including one or more sample sounds or speech commands. Further, the sound sensor 310 may employ any suitable software or hardware for performing such functions.

The keyword model generator 322 may receive the one or more sample sounds from the sound sensor 310 and generate a speaker-dependent keyword model for the user-designated keyword based on the sample sounds. In some embodiments, the keyword model generator 322 may perform subword recognition on each sample sound for the keyword and generate a subword network for the keyword from the subword recognition result. Based on the subword network, the keyword model generator 322 may generate the speaker-dependent keyword model for the keyword that may include a plurality of keyword model parameters and threshold values. The speaker-dependent keyword model generated by the keyword model generator 322 may be added to a database of keyword models stored in the storage unit 340.

In one embodiment, the keyword model generated 322 may also receive the text for the keyword from the I/O unit 360. The text for the keyword may then be associated with the speaker-dependent keyword model. In this case, the text for the keyword may also be stored as a part of the speaker-dependent keyword model.

The keyword setting unit 324 may be configured to associate the user-designated keyword with a function (e.g., a feature, an application, etc.) in the electronic device 110 selected by a user via the I/O unit 360. Upon associating the user-designated keyword with the selected function, the keyword setting unit 324 may add the user-designated keyword and the associated function to a keyword-to-function database in the storage unit 340. In addition, the speaker-dependent keyword model for the user-designated keyword may be retrieved from the database of keyword models and stored in the keyword-to-function database in association with the keyword and function. If an existing keyword-to-function database is not found in the storage unit 340, the keyword setting unit 324 may generate a keyword-to-function database that maps the user-designated keyword to the selected function for storage in the storage unit 340. In some embodiments, the keyword setting unit 324 may update the keyword-to-function database in response to additional designation of keywords and selection of functions or deletion of existing entries in the database.

The keyword detection unit 326 may be configured to detect the user-designated keyword from an input sound received via the sound sensor 310 by accessing keyword models in the keyword-to-function database including the speaker-dependent keyword model for the user-designated keyword. In this process, a confidence score of the input sound may be calculated for each of the keyword models in the keyword-to-function database. For example, the confidence score may be calculated by determining a keyword score and non-keyword score for the input sound and subtracting the non-keyword score from the keyword score.

In one embodiment, the keyword detection unit 326 may select a keyword model having a highest confidence score. If the confidence score is greater than or equal to a first threshold value in the keyword model, the keyword detection unit 326 may determine that the keyword associated with the keyword model has been detected from the input sound. Further, if the confidence score is greater than or equal to a second threshold value and smaller than the first threshold value in the keyword model, the keyword detection unit 326 may determine that the keyword associated with the keyword model has not been detected from the input sound. In this case, the keyword detection unit 326 may update a count indicative of a number of missed detections and store the count in the keyword-to-function database. The count may be used for determining whether to use a speaker-independent keyword model instead of to speaker-dependent keyword model as will be described below in detail. On the other hand, if the confidence score is smaller than the second threshold value, the keyword may be determined not to be detected and the count may not be updated.

When the user-designated keyword has been detected from the input sound, the keyword detection unit 326 may generate a detection signal indicating that the user-designated keyword has been detected. The function management unit 328 may receive the detection signal and access the keyword-to-function database in the storage unit 340 to identify the function associated with the detected user-designated keyword. The function management unit 328 may then perform the identified function associated with the detected user-designated keyword.

In accordance with an embodiment, when the speaker-dependent keyword model has been generated by the keyword model generator 322, the keyword model management unit 330 may generate a request for a speaker-independent keyword model associated with the user-designated keyword that may be used in detecting the user-designated keyword. The request may include at least one of the user-designated keyword (i.e., text of the user-designated keyword), the one or more sample sounds for the user-designated keyword, at least one sound feature extracted from the one or more sample sounds, and the speaker-dependent keyword model generated by the keyword model generator 322. If the user-designated keyword is included in the request, the user-designated keyword may be a text string or one or more words. The keyword model management unit 330 may send the request to the keyword model server 120 via the communication unit 350 over the communication network 140. If the speaker-independent keyword model adapted for detecting the user-designated keyword spoken by a plurality of users is received from the keyword model server 120, the keyword model management unit 330 may update the database of keyword models in the storage unit 340 by adding the received speaker-independent keyword model.

Due to the speaker-dependent characteristics, while the speaker-dependent keyword model generated by the keyword model generator 322 may be useful in detecting the user-designated keyword from utterances spoken by the user, it may not be well suited for detecting the keyword from utterances of other users. In these cases, a speaker-independent keyword model received from the keyword model server 120 may be used rather than the speaker-dependent keyword model generated by the keyword model generator 322 for detecting the user-designated keyword spoken by different users with higher accuracy. In one embodiment, upon receiving the speaker-independent keyword model from the keyword model server 120, the keyword model management unit 330 may immediately replace the speaker-dependent keyword model for the user-designated keyword in the keyword-to-function database with the speaker-independent keyword model for the user-designated keyword.

In another embodiment, the keyword model management unit 330 may determine whether the user-designated keyword includes one or more private keywords (e.g., "BANKING" "CONTACT," "MESSAGE," "CALENDAR," "E-MAIL," etc.) from a database of security keywords in the storage unit 340. For example, a private keyword may indicate that a function associated with a keyword may be accessed by a specified user. If the keyword model management unit 330 determines that the user-designated keyword includes one or more private keywords, the keyword detection unit 326 may continue to detect the user-designated keyword from an input sound by using the speaker-dependent keyword in the keyword-to-function database for security purposes. In this case, the speaker-dependent keyword model for the user-designated keyword in the keyword-to-function database may not be replaced with the speaker-independent keyword model for the user-designated keyword.

Alternatively or additionally, the keyword model management unit 330 may determine whether the user-designated keyword includes one or more non-private keywords (e.g., "INTERNET," "TV," "RADIO," "WEATHER," "MUSIC," "TIME," etc.) from the database of security keywords. For example, a non-private keyword may indicate that a function associated with a keyword may be accessed by any user. If the user-designated keyword is determined to include one or more non-private keywords, the keyword model management unit 330 may replace the speaker-dependent keyword model for the user-designated keyword in the keyword-to-function database with the speaker-independent keyword model for the user-designated keyword. The keyword detection unit 326 may then detect the user-designated keyword from an input sound by using the speaker-independent keyword model in the keyword-to-function database. In some embodiments, it may be predetermined whether the speaker-independent keyword model replaces the speaker-dependent keyword model or not in a case where the user-designated keyword is determined to include both one or more private keywords and one or more non-private keywords.

According to one embodiment, the keyword model management unit 330 may access the keyword-to-function database to identify a function associated with the user-designated keyword and determine a security level of the associated function by accessing a security level database in the storage unit 340. If the security level of the function is determined to be a low security level, the keyword model management unit 330 may replace the speaker-dependent keyword model for the user-designated keyword in the keyword-to-function database with the speaker-independent keyword model for the user-designated keyword. The keyword detection unit 326 may then detect the user-designated keyword from an input sound based on the speaker-independent keyword model in the keyword-to-function database. On the other hand, if the security level of the function is determined to be a high security level, the keyword detection unit 326 may continue to detect the user-designated keyword from an input sound by using the speaker-dependent keyword model in the keyword-to-function database.

In one embodiment, the keyword model management unit 330 may access the keyword-to-function database and retrieve the count indicative of a number of missed detections for the user-designated keyword. If the count is determined to be greater than or equal to a predetermined number, the keyword model management unit 330 may replace the speaker-dependent keyword model for the user-designated keyword in the keyword-to-function database with the speaker-independent keyword model for the user-designated keyword. In this case, the keyword detection unit 326 may use the speaker-independent keyword model in the keyword-to-function database to detect the user-designated keyword from an input sound. According to some embodiments, the keyword model management unit 330 may be configured to replace a speaker-dependent keyword model in the keyword-to-function database with a speaker-independent keyword model when some or all of the above conditions (i.e., private keyword, non-private keyword, security level, and count) are satisfied.

Alternatively or additionally, the keyword model management unit 330 may add the speaker-independent keyword model for the user-designated keyword to the keyword-to-function database upon receiving the speaker-independent keyword model. In this case, the keyword detection unit 326 may use both the speaker-dependent and speaker-independent keyword models associated with the user-designated keyword for verifying an input sound as being indicative of the user who provided the sample sounds used in generating the speaker-dependent keyword model. For example, the keyword detection unit 326 may determine a keyword score for an input sound by using the speaker-dependent keyword model and determine a non-keyword score for the input sound by using the speaker-independent keyword model. Based on the keyword score and non-keyword score, the keyword detection unit 326 may verify the input sound as being indicative of the user. For example, the keyword detection unit 326 may verify the input sound as being indicative of the user if a difference between the keyword score and the non-keyword score is greater than or equal to a predetermined confidence value.

As described above, the electronic device 110 may generate a user-dependent keyword model for a user-designated keyword and then send a request to the keyword model server 120 for a user-independent keyword model. Alternatively, the electronic device 110 may first send a request to the keyword model server 120 for a user-independent keyword model associated with a user-designated keyword. If the user-independent keyword model is not received from the keyword model server 120, a user-dependent keyword model may then be generated by the electronic device 110. On the other hand, if the user-independent keyword model is received from the keyword model server 120, the electronic device 110 may use the user-independent keyword model to detect the user-designated keyword from an input sound.

Figure 4:
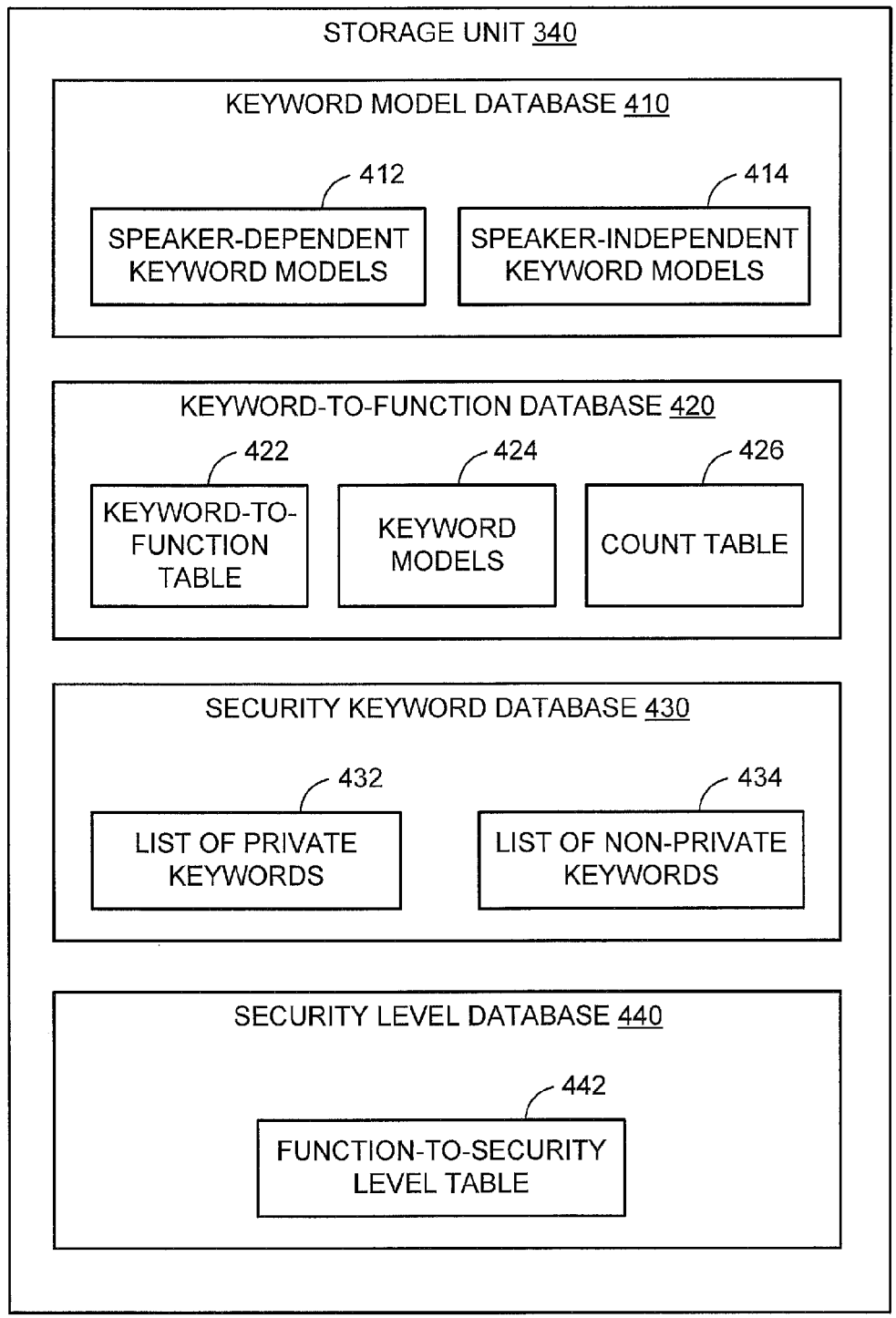
FIG. 4 illustrates a block diagram of a storage unit including a keyword model database, a keyword-to-function database, a security keyword database, and a security level database, according to one embodiment of the present disclosure.

FIG. 4 illustrates a block diagram of the storage unit 340 including a keyword model database 410, a keyword-to-function database 420, a security keyword database 430, and a security level database 440, according to one embodiment of the present disclosure. The storage unit 340 may be implemented using any suitable storage or memory devices such as a RAM (Random Access Memory), a ROM (Read-Only Memory), an EEPROM (Electrically Erasable Programmable Read-Only Memory), a flash memory, or an SSD (solid state drive). The keyword model database 410 may include one or more speaker-dependent keyword models 412 that may be generated by the keyword model generator 322. One or more speaker-independent keyword models 414 that may be received from the keyword model server 120 may also be stored in the keyword model database 410.

The keyword-to-function database 420 may include a keyword-to-function table 422, which maps one or more keywords to one or more functions. One or more keyword models 424 (e.g., speaker-dependent keyword models and speaker-independent keyword models) for the one or more keywords may also be stored in the keyword-to-function database 420 in association with the keywords and functions. The keyword detection unit 326 may detect a keyword from an input sound based on the keyword models 424, and the function management unit 328 may identify a function associated with the detected keyword by accessing the keyword-to-function table 422. The function management unit 328 may then perform the identified function associated with the detected keyword.

The keyword-to-function database 420 may also include a count table 426 including a count for each keyword, which may be indicative of a number of missed detections for the keyword. The keyword detection unit 326 may update (i.e., increase) a count for a keyword if a confidence score of an input sound for a speaker-dependent keyword model associated with the keyword is determined to be greater than or equal to a second threshold value and smaller than a first threshold value of the speaker-dependent keyword model. Based on the count table 426, the keyword model management unit 330 may determine whether to replace a speaker-dependent keyword model for a keyword in the keyword-to-function database 420 with a speaker-independent keyword model for the keyword.

As shown, the security keyword database 430 may include a list of private keywords 432 (e.g., "BANKING" "CONTACT," "MESSAGE," "CALENDAR," "E-MAIL," etc.) indicative of a high security level and a list of non-private keywords 434 (e.g., "INTERNET," "TV," "RADIO," "WEATHER," "MUSIC," "TIME," etc.) indicative of low security level. For example, a private keyword may indicate that a function associated with a keyword may be accessed by a specified user. On the other hand, a non-private keyword may indicate that a function associated with a keyword may be accessed by any user.

Based on the list of private keywords 432 and the list of non-private keywords 434, the keyword model management unit 330 may determine whether to replace a speaker-dependent keyword model for a keyword in the keyword-to-function database 420 with a speaker-independent keyword model for the keyword. In one embodiment, the keyword model management unit 330 may determine not to replace a speaker-dependent keyword model in the keyword-to-function database 420 with a speaker-independent keyword model if the keyword includes one or more private keywords (e.g., "BANKING," "CONTACT," "MESSAGE," "CALENDAR," "E-MAIL," etc.). In another embodiment, the keyword model management unit 330 may determine to replace a speaker-dependent keyword model in the keyword-to-function database 420 with a speaker-independent keyword model if the keyword includes one or more non-private keywords (e.g., "INTERNET," "TV," "RADIO," "WEATHER," "MUSIC," "TIME," etc.).

The security level database 440 may include a function-to-security level table 442, which maps one or more functions to one or more security levels. For example, each function may be associated with a high security level or a low security level. In this case, a high security level may indicate that a function may be accessed by a specified user. On the other hand, a low security level may indicate that a function may be accessed by any user.

Based on the security level of a function, the keyword model management unit 330 may determine whether to replace a speaker-dependent keyword model associated with the function with a speaker-independent keyword model. For example, if a security level of a function in the keyword-to-function table 422 is determined to be a low security level, the keyword model management unit 330 may replace a speaker-dependent keyword model in the keyword-to-function database 420 that is associated with the function with a speaker-independent keyword model. On the other hand, if a security level of a function in the keyword-to-function table 422 is determined to be a high security level, the keyword detection unit 326 may continue to detect the keyword from an input sound by using a speaker-dependent keyword model in the keyword-to-function database 420 that is associated with the function.

Figure 5:
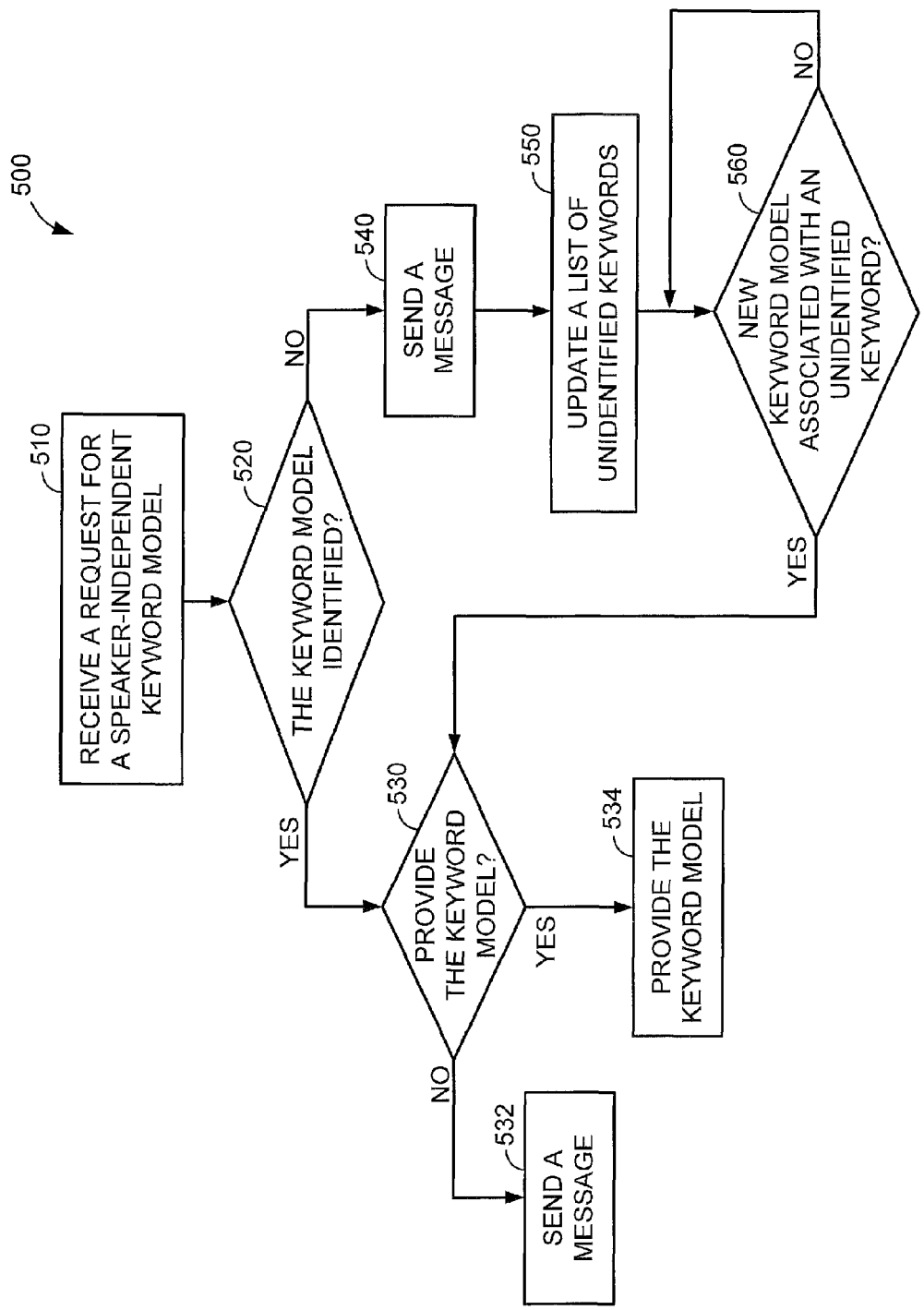
FIG. 5 illustrates a flowchart for an example of a method, performed in a keyword model server, for identifying a speaker-independent keyword model associated with a keyword designated by a user, according to one embodiment of the present disclosure.

FIG. 5 illustrates a flowchart for an example of a method, performed in the keyword model server 120, for identifying a speaker-independent keyword model associated with a keyword designated by a user, according to one embodiment of the present disclosure. At 510, the keyword model server 120 may receive a request for a speaker-independent keyword model associated with a keyword designated by a user from the electronic device 110. In one embodiment, the request may include at least one of the user-designated keyword, at least one sample sound for the user-designated keyword, at least one sound feature extracted from the at least one sample sound, and a speaker-dependent keyword model of the user-designated keyword. If the user-designated keyword is included in the request, the user-designated keyword may be a text string or one or more words.

Upon receiving the request, the keyword model server 120 may access its keyword model database 410 to identify a speaker-independent keyword model associated with the user-designated keyword, at 520. For example, the keyword model server 120 may determine whether a plurality of speaker-independent keyword models in the keyword model database 410 includes the speaker-independent keyword model associated with the user-designated keyword. In some embodiments, the keyword model server 120 may identify a speaker-independent keyword model associated with the user-designated keyword based on at least one of the user-designated keyword, the at least one sample sound, the at least one sound feature, and the speaker-dependent keyword model in the request.

If it is determined that the plurality of speaker-independent keyword models in the keyword model database 410 includes the speaker-independent keyword model for the user-designated keyword (i.e., YES at 520), the method may proceed to 530 and determine whether to provide the speaker-independent keyword model for the user-designated keyword to the electronic device 110. In one embodiment, the keyword model server 120 may determine whether the user-designated keyword includes one or more private keywords. If the user-designated keyword is determined to include one or more private keywords (i.e., NO at 530), the keyword model server 120 may send a message to the electronic device 110 that the speaker-independent keyword model is not being sent for security purposes, at 532. If the user-designated keyword does not include a private keyword (i.e., YES at 530), the keyword model server 120 may provide the speaker-independent keyword model to the electronic device 110, at 534.

Alternatively or additionally, the keyword model server 120 may determine whether the user-designated keyword includes one or more non-private keywords. If the user-designated keyword is determined to include one or more non-private keywords (i.e., YES at 530), the keyword model server 120 may provide the speaker-independent keyword model to the electronic device 110, at 534. If the user-designated keyword does not include a non-private keyword (i.e., NO at 530), the keyword model server 120 may send a message to the electronic device 110 that the speaker-independent keyword model is not being sent for security purposes, at 532

On the other hand, if it is determined that the plurality of speaker-independent keyword models in the keyword model database 410 does not include a speaker-independent keyword model associated with the user-designated keyword (i.e., NO at 520), the keyword model server 120 may send a message to the electronic device 110 that no speaker-independent keyword model associated with the keyword is available, at 540. The keyword model server 120 may also update the unidentified keyword database 226 with the user-designated keyword, at 550. Alternatively or additionally, the keyword model server 120 may update the unidentified keyword database 226 with one or more sample sounds for the user-designated keyword, one or more sound features extracted from the one or more sample sounds, and/or the speaker-dependent keyword model that may be included in the request.

At 560, the keyword model server 120 may determine whether a new speaker-independent keyword model, which may be received from the keyword model provider, is associated with the user-designated keyword in the unidentified keyword database 226. If the new speaker-independent keyword model is not associated with the user-designated keyword (i.e., NO at 560), the method proceeds back to 560. On the other hand, if it is determined that the new speaker-independent keyword model is associated with the user-designated keyword (i.e., YES at 560), the method may proceed to 530 to determine whether to provide the new speaker-independent keyword model to the electronic device 110.

Figure 6A:
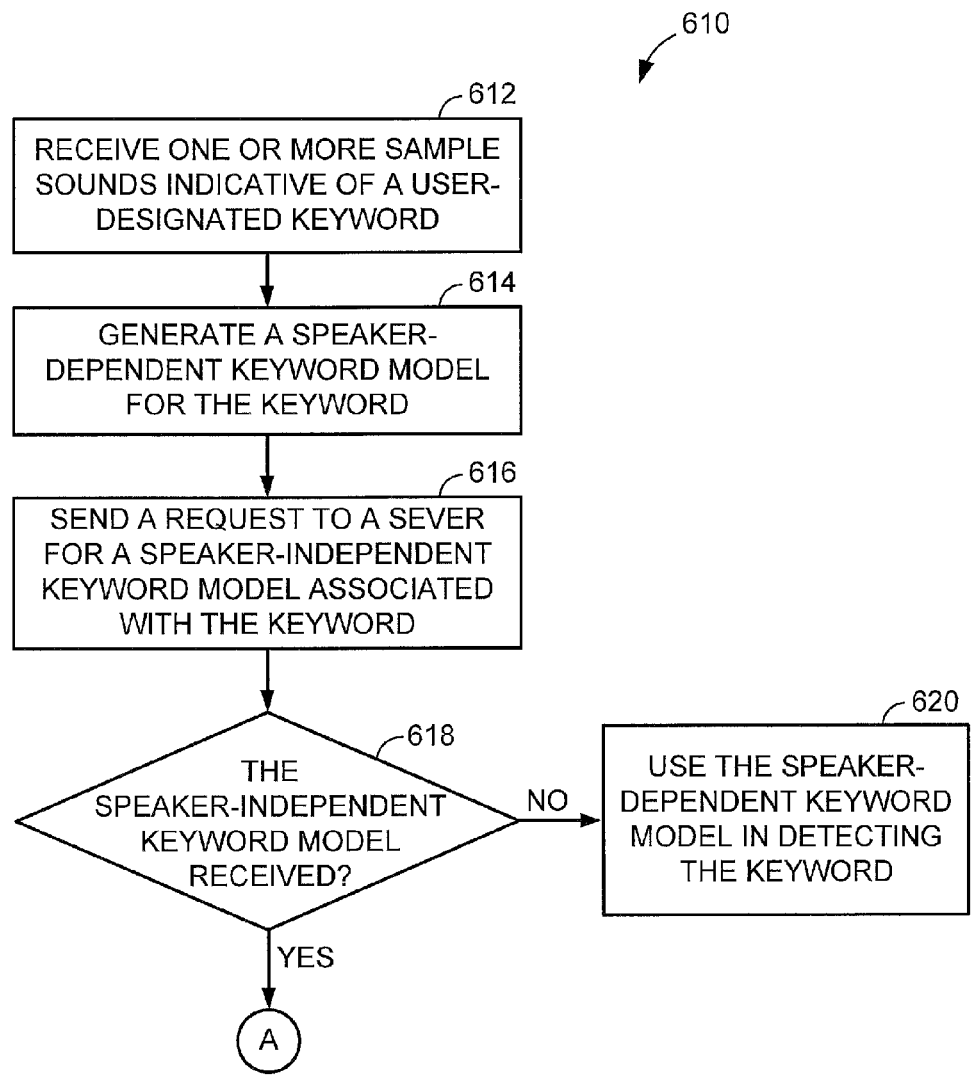
FIG. 6A illustrates a flowchart for an example of a method, performed in an electronic device, for obtaining a speaker-independent keyword model associated with a keyword designated by a user, according to one embodiment of the present disclosure.

FIG. 6A illustrates a flowchart for an example of a method 610, performed in the electronic device 110, for obtaining a speaker-independent keyword model associated with a keyword designated by a user, according to one embodiment of the present disclosure. Initially, the electronic device 110 may receive one or more samples sounds indicative of a user-designated keyword from a user, at 612. Based on the one or more sample sounds, the electronic device 110 may generate a speaker-dependent keyword model for the user-designated keyword, at 614.

Upon generating the speaker-dependent keyword model, the electronic device 110 may send a request to the keyword model server 120 for a speaker-independent keyword model associated with the user-designated keyword, at 616. In one embodiment, the request may include at least one of the user-designated keyword, the one or more sample sound, one or more sound features extracted from the one or more sample sounds, and the speaker-dependent keyword model generated by the electronic device 110. In the case of the user-designated keyword, the keyword in the request may be a text string or one or more words.

At 618, the electronic device 110 may determine whether the speaker-independent keyword model associated with the user-designated keyword is received from the keyword model server 120. If the speaker-independent keyword model is not received from the keyword model server 120, for example, if the electronic device 110 receives a message that the speaker-independent keyword model is not being sent for security purposes (i.e., NO at 618), the method 610 may proceed to 620 to detect the user-designated keyword from an input sound by using the speaker-dependent keyword model. On the other hand, if the speaker-independent keyword model is received from the keyword model server 120 (i.e., YES at 618), the method 610 may proceed to 630 in FIG. 6B to store the received speaker-independent keyword model in the keyword model database 410.

Figure 6B:
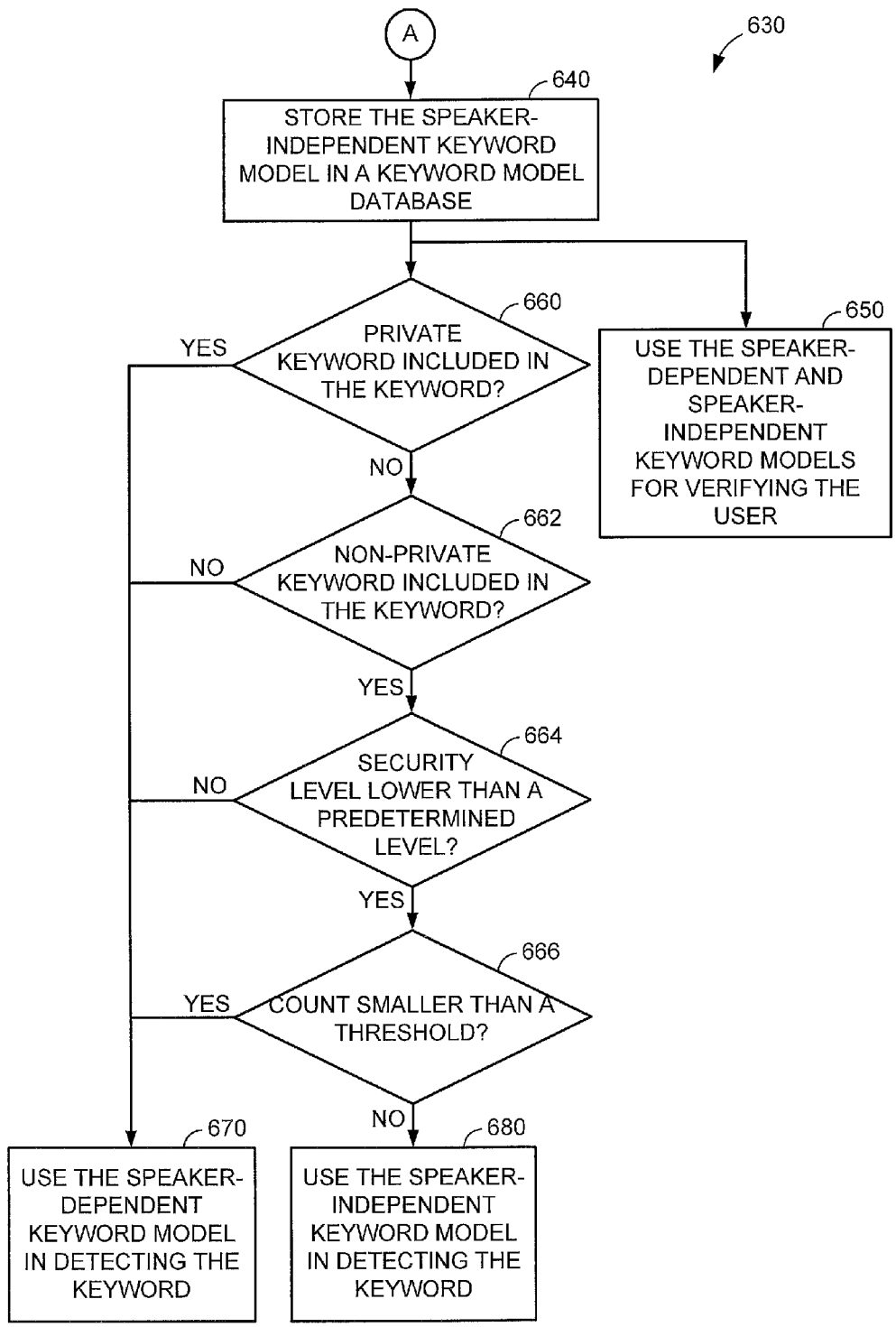
FIG. 6B illustrates a flowchart for an example of a method, performed in an electronic device, for using at least one of a speaker-dependent keyword model and a speaker-independent keyword model in detecting a user-designated keyword, according to one embodiment of the present disclosure.

FIG. 6B illustrates a flowchart for an example of a method 630 performed in the electronic device 110, for using at least one of the speaker-dependent and speaker-independent keyword models in detecting the user-designated keyword, according to one embodiment of the present disclosure. At 640, the electronic device 110 may store the speaker-independent keyword model received from the keyword model server 120 in the keyword model database 410. In one embodiment, the method 630 may proceed to 650 to use both the speaker-dependent and speaker-independent keyword models for verifying a speaker of an utterance in an input sound as the user who provided the sample sounds for generating the speaker-dependent keyword model.

For example, the electronic device 110 may determine a keyword score for an input sound by using the speaker-dependent keyword model and determine a non-keyword score for the input sound by using the speaker-independent keyword model. Based on the keyword score and non-keyword score, the electronic device 110 may verify the input sound as being indicative of the user. For example, the keyword detection unit 326 may verify the input sound as being indicative of the user if a difference between the keyword score and the non-keyword score is greater than or equal to a predetermined confidence value.

In another embodiment, the method may proceed to 660 to determine whether a private keyword indicative of a high security level is included in the user-designated keyword. A private keyword may indicate that a function associated with a keyword may be accessed by a specified user. If the user-designated keyword is determined to include one or more private keywords (i.e., YES at 660), the method 630 may proceed to 670 to use the speaker-dependent keyword model in detecting the user-designated keyword from an input sound. On the other hand, the method 630 may proceed to 662 if no private keyword is included in the user-designated keyword (i.e., NO at 660).

At 662, the electronic device 110 may determine whether a non-private keyword indicative of a low security level is included in the user-designated keyword. A non-private keyword may indicate that a function associated with a keyword may be accessed by any user. If it is determined that the user-designated keyword does not include a non-private keyword (i.e., NO at 662), the method 630 may proceed to 670 to use the speaker-dependent keyword model in detecting the user-designated keyword from an input sound. On the other hand, the method 630 may proceed to 664 if one or more non-private keywords are included in the user-designated keyword (i.e., YES at 662).

At 664, the electronic device 110 may determine whether a function associated with the user-designated keyword has a security level lower than a predetermined security level. For example, if the associated function is determined to have a high security level (i.e., NO at 664), the method 630 may proceed to 670 to use the speaker-dependent keyword model in detecting the user-designated keyword from an input sound. On the other hand, the method 630 may proceed to 666 if the associated function has a low security level (i.e., YES at 664).

At 666, the electronic device 110 may determine whether a count for the user-designated keyword is less than a predetermined threshold. In this case, the count for the user-designated keyword may be indicative of a number of missed detections of the user-designated keyword. In one embodiment, the electronic device 110 may determine that the user-designated keyword has been miss-detected if a confidence score of an input sound for the speaker-dependent keyword model is greater than or equal to a second threshold value and less than a first threshold value in the speaker-dependent keyword model.

If the count for the user-designated keyword is determined to be smaller than the predetermined threshold (i.e., YES at 666), the method 630 may proceed to 670 to use the speaker-dependent keyword model in detecting the user-designated keyword from an input sound. On the other hand, the method 630 may proceed to 680 to use the speaker-independent keyword model in detecting the user-designated keyword, if the count for the user-designated keyword is determined to be greater than the predetermined threshold (i.e., YES at 666). Although the method 630 is illustrated as proceeding to 680 when all of the four conditions at 660, 662, 664, and 666 are satisfied in that order, the method 630 may also proceed to 680 when at least one of the conditions at 660, 662, 664, and 666 is satisfied, or some of the conditions at 660, 662, 664, and 666 are satisfied in any suitable order.

Figure 7:
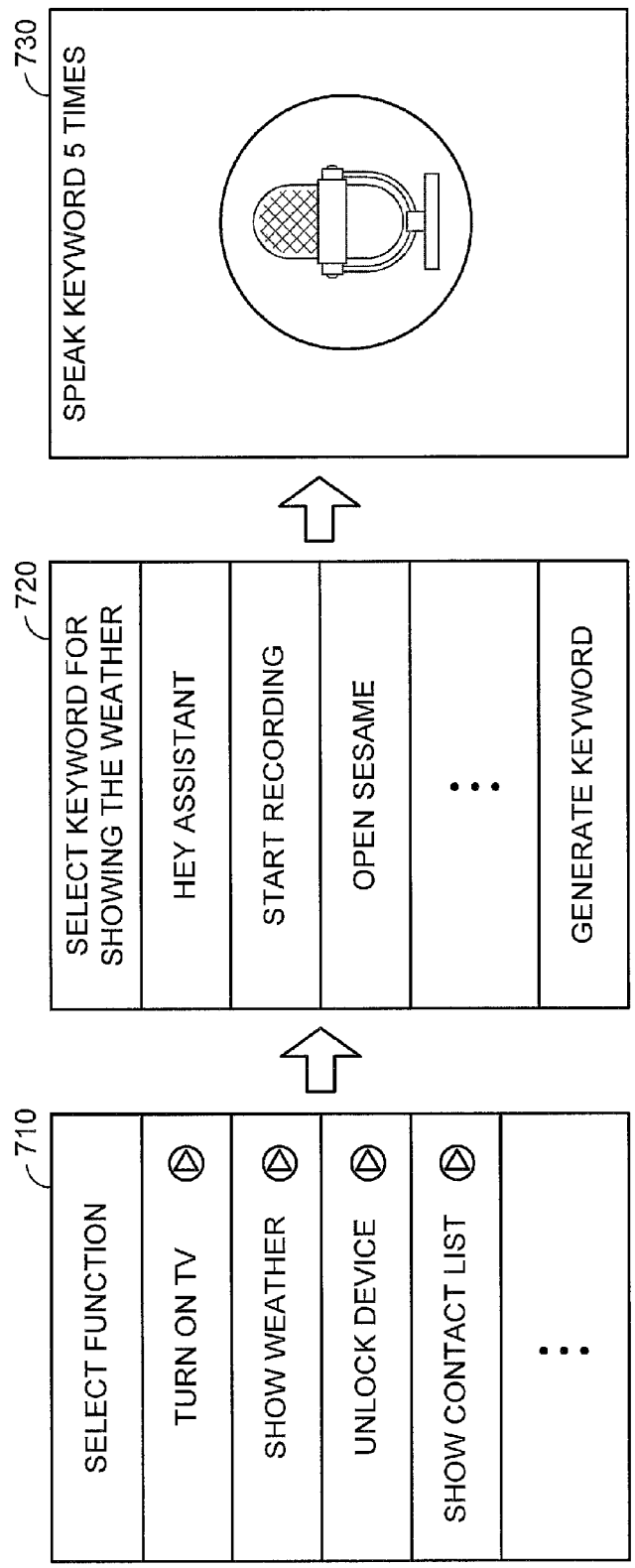
FIG. 7 illustrates a display screen of an electronic device showing a plurality of menus for assigning a keyword, which may be designated by a user, to a function according to one embodiment of the present disclosure.

FIG. 7 illustrates a display screen of the electronic device 110 showing menus 710, 720, and 730 for assigning a keyword, which may be designated by a user, to a function according to one embodiment of the present disclosure. Initially, the menu 710 may be displayed on the display screen of the I/O unit 360 for selecting a function from a list of functions. As illustrated, the list of the functions may include turning on a TV, showing the weather, unlocking the electronic device 110, showing a contact list of the electronic device 110, etc.

A user on the electronic device 110 may select a function from the menu 710. For example, the user may select the function "SHOW WEATHER." In response, the electronic device 110 may display the menu 720 to allow the user to select a keyword for performing the selected function, i.e., showing the weather.

The menu 720 for selecting a keyword may display a list of keywords associated with keyword models in the keyword model database 410 of the electronic device 110. The user may select a keyword from the menu 720 to assign the selected keyword to the function "SHOW WEATHER." The menu 720 may also provide a menu item for generating a new keyword, which may be designated by the user. For example, the user may launch the menu 730 by selecting the menu item "GENERATE KEYWORD." In this case, the user may generate a speaker-dependent keyword model of a user-designated keyword (e.g., "HOW IS THE WEATHER") by speaking the keyword 5 times. In one embodiment, the electronic device 110 may also ask the user to input text for the keyword.

Once the speaker-dependent keyword model of the user-designated keyword is generated, the electronic device 110 may update the keyword-to-function database 420 by mapping the user-designated keyword (e.g., "HOW IS THE WEATHER") and the speaker-dependent keyword model for the keyword to the selected function "SHOW WEATHER." In one embodiment, the electronic device 110 may receive a speaker-independent keyword model for the user-designated keyword (e.g., "HOW IS THE WEATHER") and replace the speaker-dependent keyword model with the received speaker-independent keyword model. For example, the electronic device 110 may have determined to replace the speaker-dependent keyword model with the speaker-independent keyword model since the user-designated keyword includes a non-private keyword "WEATHER." In the illustrated embodiment, although the function is selected before the keyword is selected, the keyword may be selected before the function is selected in some embodiments.

Figure 8A:
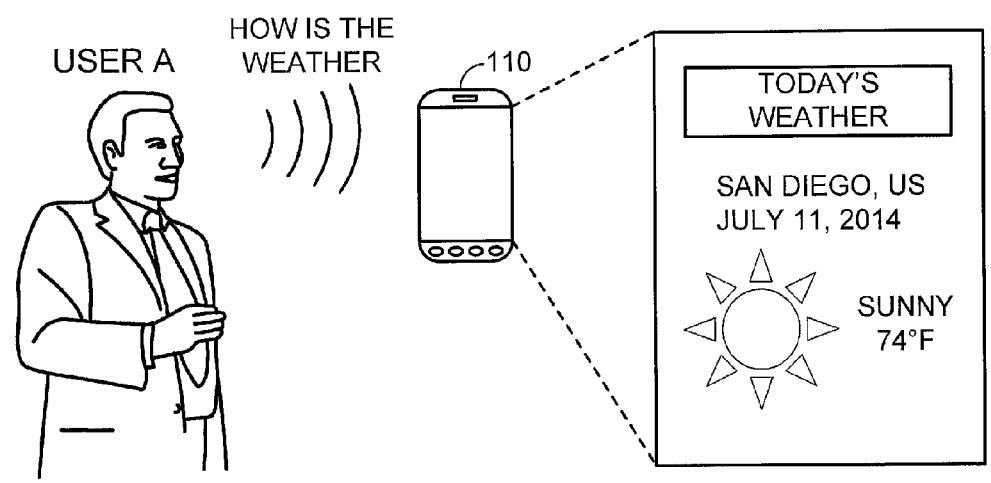
FIG. 8A illustrates an electronic device configured to perform a function for showing the weather upon detecting an associated keyword from an utterance spoken by a user who generated a speaker-dependent keyword model for the keyword, according to one embodiment of the present disclosure.

FIG. 8A illustrates the electronic device 110 configured to perform a function for showing the weather upon detecting an associated keyword from an utterance spoken by a user who generated a speaker-dependent keyword model for the keyword, according to one embodiment of the present disclosure. In the illustrated embodiment, the electronic device 110 may include a speaker-dependent keyword model for a keyword "HOW IS THE WEATHER" generated based on sample sounds from a specific user (i.e., user A). The electronic device 110 may also include a speaker-independent keyword model for the keyword "HOW IS THE WEATHER" received from the keyword model server 120.

In some embodiments, the electronic device 110 may determine to use the speaker-independent keyword model for the keyword "HOW IS THE WEATHER" instead of using the speaker-dependent keyword. For example, the electronic device 110 may determine to use the speaker-independent keyword model since the keyword "HOW IS THE WEATHER" includes a non-private keyword "WEATHER." Alternatively or additionally, the electronic device 110 may determine to use the speaker-independent keyword model since the keyword "HOW IS THE WEATHER" does not include a private keyword.

In another embodiment, the electronic device 110 may determine to use the speaker-independent keyword model since the function for showing the weather has a low security level. In yet another embodiment, the electronic device 110 may determine to use the speaker-independent keyword model since a count indicative of a number of missed detections for the keyword "HOW IS THE WEATHER" is greater than or equal to a predetermined number. In these cases, the electronic device 110 may detect the keyword "HOW IS THE WEATHER" from utterances of different speakers with high accuracy due to the speaker-independent characteristics.

In the illustrated embodiment, the user A may speak the keyword "HOW IS THE WEATHER" to activate the function for showing the weather. Since the electronic device 110 is configured to detect the keyword "HOW IS THE WEATHER" from an input sound based on the speaker-independent keyword model, the electronic device 110 may detect the keyword from the user A. Accordingly, the electronic device 110 may access weather information through the communication network 140 based on GPS (Global Positioning System) information of the electronic device 110, and display received weather information on a display screen for the user A.

Figure 8B:
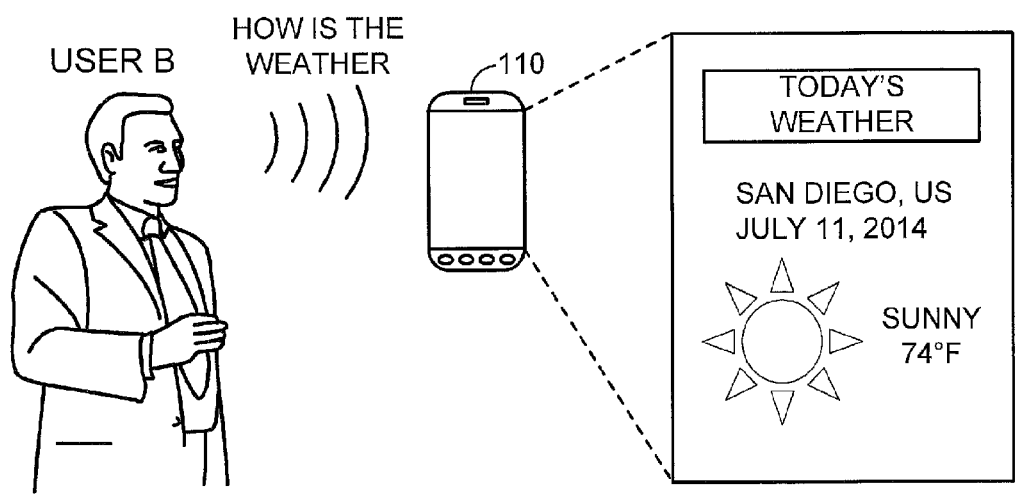
FIG. 8B illustrates an electronic device configured to perform a function for showing the weather upon detecting an associated keyword from an utterance spoken by a different user, according to one embodiment of the present disclosure.

FIG. 8B illustrates the electronic device 110 configured to perform the function for showing the weather upon detecting the associated keyword from an utterance spoken by a different user, according to one embodiment of the present disclosure. In the illustrated embodiment, the electronic device 110 may be the same electronic device in FIG. 8A and may be configured to detect the keyword "HOW IS THE WEATHER" from an input sound based on the speaker-independent keyword model. Due to the speaker-independent characteristics of the speaker-independent keyword model, the electronic device 110 may detect the keyword when user B speaks the keyword "HOW IS THE WEATHER." In response to detecting the keyword, the electronic device 110 may access weather information through the communication network 140 based on GPS (Global Positioning System) information of the electronic device 110, and display received weather information on a display screen for the user B.

Figure 9A:
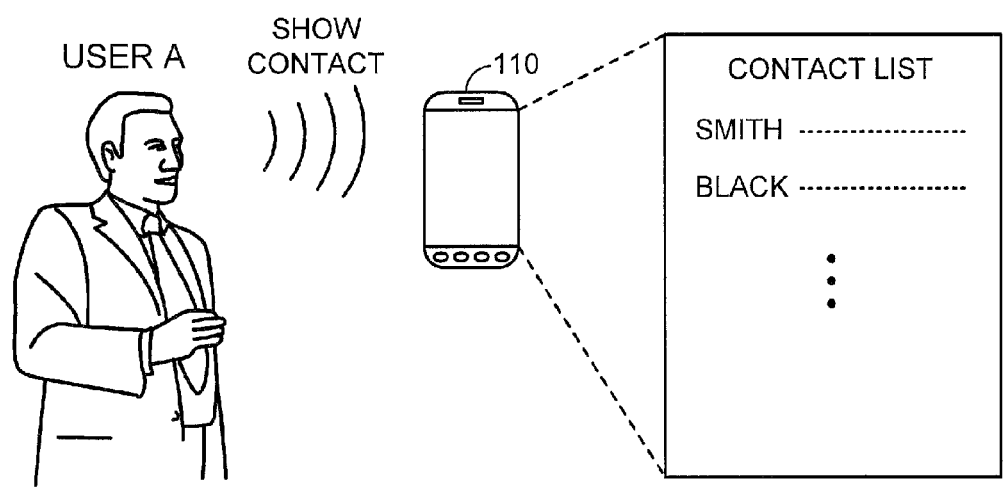
FIG. 9A illustrates an electronic device configured to perform a function for showing a contact list upon detecting an associated keyword from an utterance spoken by a user who generated a speaker-dependent keyword model for the keyword, according to one embodiment of the present disclosure.

FIG. 9A illustrates the electronic device 110 configured to perform a function for showing a contact list upon detecting an associated keyword from an utterance spoken by a user who generated a speaker-dependent keyword model for the keyword, according to one embodiment of the present disclosure. In the illustrated embodiment, the electronic device 110 may include a speaker-dependent keyword model for a keyword "SHOW CONTACT" generated based on utterances spoken by a specific user (i.e., user A). The electronic device 110 may also include a speaker-independent keyword model for the keyword "SHOW CONTACT" received from the keyword model server 120.

In some embodiments, the electronic device 110 may determine to use the speaker-dependent keyword model for the keyword "SHOW CONTACT" instead of using the speaker-independent keyword. For example, the electronic device may determine to use the speaker-dependent keyword model since the keyword "SHOW CONTACT" includes a private keyword "CONTACT." Alternatively or additionally, the electronic device 110 may determine to use the speaker-dependent keyword model since the keyword "SHOW CONTACT" does not include a non-private keyword.

In another embodiment, the electronic device 110 may determine to use the speaker-dependent keyword model since the function for showing the contact list of the electronic device 110 has a high security level. In yet another embodiment, the electronic device 110 may determine to use the speaker-dependent keyword model since a count indicative of a number of missed detections for the keyword "SHOW CONTACT" is less than a predetermined number. In these cases, the speaker-dependent keyword model may detect the keyword "SHOW CONTACT" from utterances spoken by the user A, but may not be able to detect the keyword from utterances of other users due to the speaker-dependent characteristics.

In the illustrated embodiment, the user A may speak the keyword "SHOW CONTACT" to activate the function for showing the contact list of the electronic device 110. Since the electronic device 110 is configured to detect the keyword from an input sound based on the speaker-dependent keyword model, the electronic device 110 may detect the keyword "SHOW CONTACT" from the speech command from the user A. Accordingly, the electronic device 110 may display the contact list of the electronic device 110 on a display screen for user A.

In another embodiment, the electronic device 110 may use both the speaker-dependent and speaker-independent keyword models for the keyword "SHOW CONTACT" to verify an input sound as being indicative of user A. In this case, the electronic device 110 may determine a keyword score for the input sound based on the speaker-dependent keyword model and determine a non-keyword score for the input sound based on the speaker-independent keyword model. If the confidence score, which may be calculated by subtracting the non-keyword score from the keyword score, is greater than a threshold value, the input sound may be determined as being indicative of user A. By using both the speaker-dependent and speaker-independent keyword models for the keyword "SHOW CONTACT" the electronic device 110 may detect the keyword spoken by user A with higher accuracy.

Figure 9B:
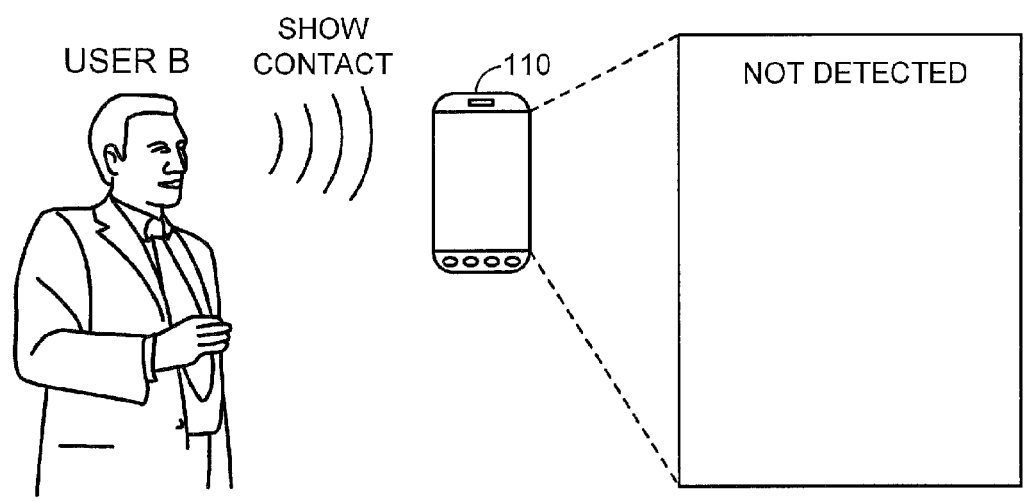
FIG. 9B illustrates an electronic device configured not to perform a function for showing a contact list when a user that did not generate a speaker-dependent keyword model speaks an associated keyword, according to one embodiment of the present disclosure.

FIG. 9B illustrates the electronic device 110 configured not to perform the function for showing the contact list when a user that did not generate the speaker-dependent keyword model speaks the keyword, according to one embodiment of the present disclosure. In the illustrated embodiment, the electronic device 110 may be the same electronic device in FIG. 9A and may be configured to detect the keyword "SHOW CONTACT" from an input sound based on the speaker-dependent keyword model generated by the user A. Due to the speaker-dependent characteristics of the speaker-dependent keyword model, the electronic device 110 may detect the keyword from user A's voice command, but may not be able to detect the keyword from user B's voice command. Accordingly, even when user B speaks the keyword "SHOW CONTACT," the electronic device 110 may fail to detect the keyword and display a message that the keyword has not been detected.

Figure 10:
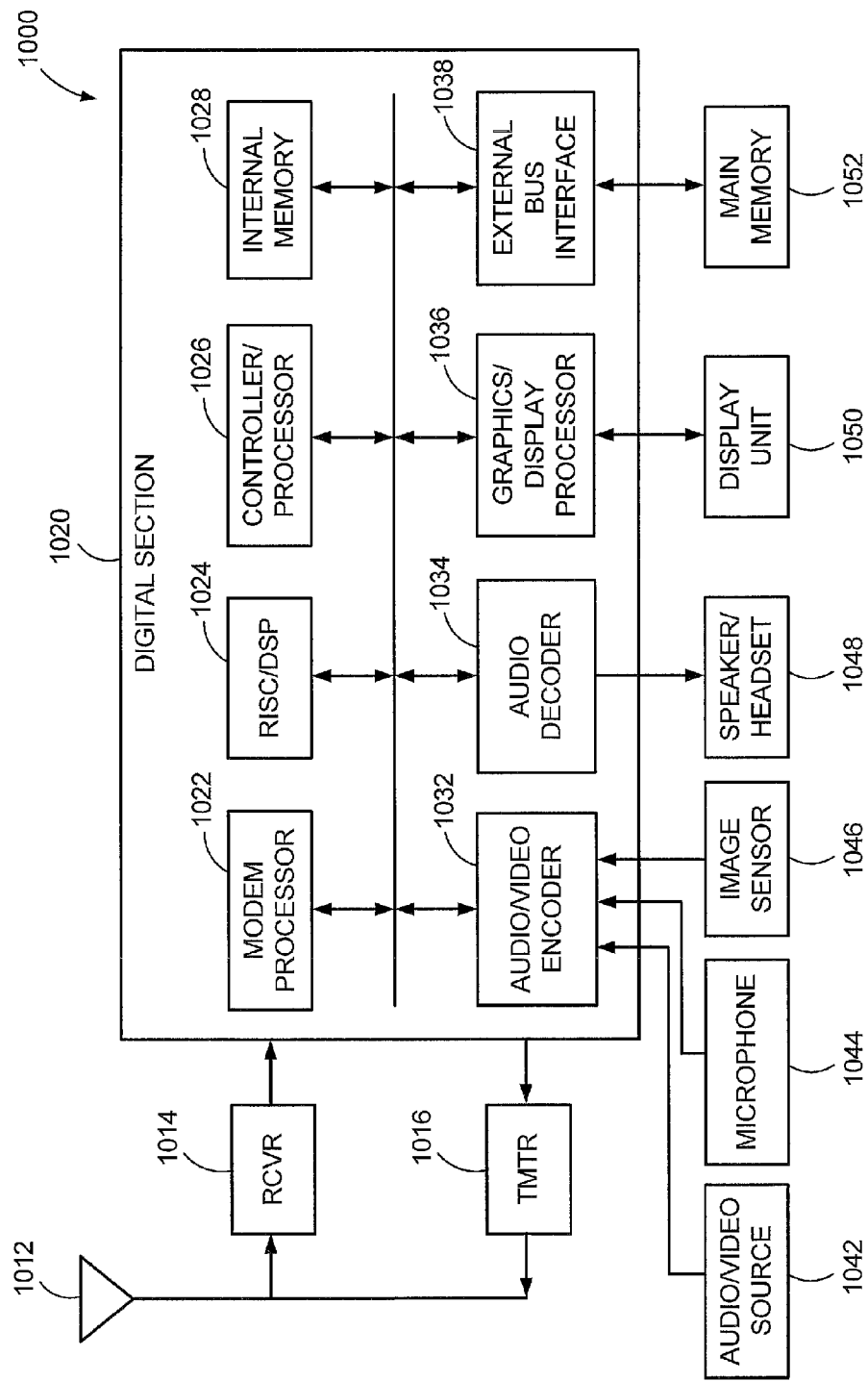
FIG. 10 illustrates a block diagram of an electronic device in a wireless communication system in which methods and devices for obtaining a speaker-independent keyword model for a keyword designated by a user may be implemented, according to some embodiments of the present disclosure.

FIG. 10 is a block diagram of an exemplary electronic device 1000 in which the methods and apparatus for obtaining a speaker-independent keyword model for a keyword designated by a user may be implemented, according to some embodiments of the present disclosure. The configuration of the electronic device 1000 may be implemented in the electronic devices according to the above embodiments described with reference to FIGS. 1 to 9. The electronic device 1000 may be a cellular phone, a smartphone, a tablet computer, a laptop computer, a terminal, a handset, a personal digital assistant (PDA), a wireless modem, a cordless phone, etc. The wireless communication system may be a Code Division Multiple Access (CDMA) system, a Broadcast System for Mobile Communications (GSM) system, Wideband CDMA (WCDMA) system, Long Term Evolution (LTE) system, LTE Advanced system, etc. Further, the electronic device 1000 may communicate directly with another mobile device, e.g., using Wi-Fi Direct or Bluetooth.

The electronic device 1000 is capable of providing bidirectional communication via a receive path and a transmit path. On the receive path, signals transmitted by base stations are received by an antenna 1010 and are provided to a receiver (RCVR) 1014. The receiver 1014 conditions and digitizes the received signal and provides samples such as the conditioned and digitized digital signal to a digital section for further processing. On the transmit path, a transmitter (TMTR) 1016 receives data to be transmitted from a digital section 1020, processes and conditions the data, and generates a modulated signal, which is transmitted via the antenna 1010 to the base stations. The receiver 1014 and the transmitter 1016 may be part of a transceiver that may support CDMA, GSM, LTE, LTE Advanced, etc.

The digital section 1020 includes various processing, interface, and memory units such as, for example, a modem processor 1022, a reduced instruction set computer/digital signal processor (RISC/DSP) 1024, a controller/processor 1026, an internal memory 1028, a generalized audio/video encoder 1032, a generalized audio decoder 1034, a graphics/display processor 1036, and an external bus interface (EBI) 1038. The modem processor 1022 may perform processing for data transmission and reception, e.g., encoding, modulation, demodulation, and decoding. The RISC/DSP 1024 may perform general and specialized processing for the electronic device 1000. The controller/processor 1026 may perform the operation of various processing and interface units within the digital section 1020. The internal memory 1028 may store data and/or instructions for various units within the digital section 1020.

The generalized audio/video encoder 1032 may perform encoding for input signals from an audio/video source 1042, a microphone 1044, an image sensor 1046, etc. The generalized audio decoder 1034 may perform decoding for coded audio data and may provide output signals to a speaker/headset 1048. The graphics/display processor 1036 may perform processing for graphics, videos, images, and texts, which may be presented to a display unit 1050. The EBI 1038 may facilitate transfer of data between the digital section 1020 and a main memory 1052.

The digital section 1020 may be implemented with one or more processors, DSPs, microprocessors, RISCs, etc. The digital section 1020 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

Figure 11:
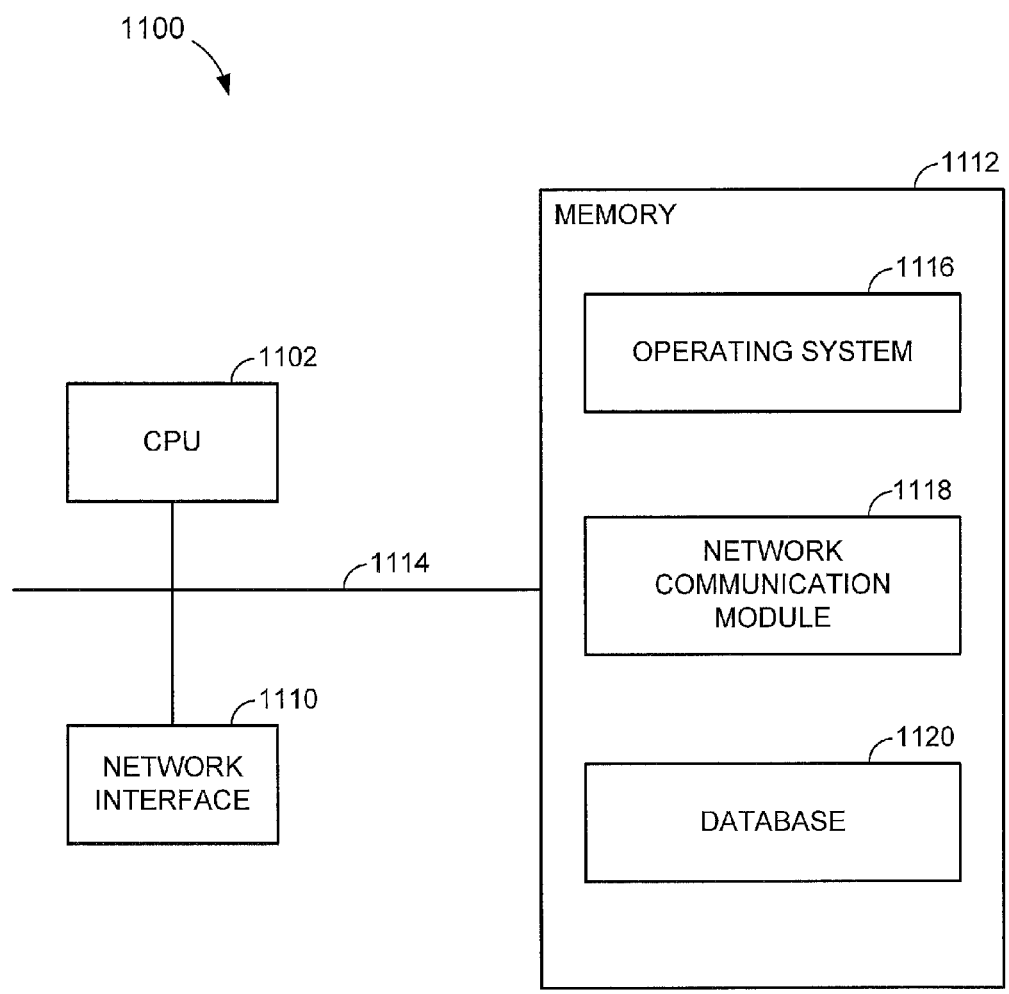
FIG. 11 illustrates a block diagram of a server system in which methods and devices for identifying a speaker-independent keyword model associated with a keyword designated by a user may be implemented in accordance with some embodiments of the present disclosure.

FIG. 11 illustrates a block diagram of a server system 1100 in which methods and devices for identifying a speaker-independent keyword model associated with a keyword designated by a user may be implemented in accordance with some embodiments of the present disclosure. The server system 1100 may include one or more processing units (CPUs) 1102, one or more network or other communication network interfaces 1110, a memory 1112, and one or more communication buses 1114 for interconnecting these components. The server system 1100 may also include a user interface (not shown) having a display device and a keyboard.

The memory 1112 may be any suitable memory, such as a high-speed random access memory, (e.g., DRAM, SRAM, DDR RAM or other random access solid state memory devices). The memory 1112 may include or may alternatively be non-volatile memory (e.g., one or more magnetic disk storage devices, optical disk storage devices, flash memory devices, or other non-volatile solid state storage devices). In some embodiments, the memory 1112 may include one or more storage devices remotely located from the CPU(s) 1102 and/or remotely located in multiple sites.

Any one of the above memory devices represented by the memory 1112 may store any number of modules or programs that corresponds to a set of instructions for performing and/or executing any of the processes, operations, and methods previously described. For example, the memory 1112 may include an operating system 1116 configured to store instructions that include procedures for handling various basic system services and for performing hardware dependent tasks. A network communication module 11110 of the memory 1112 may be used for connecting the server system 1100 to other computers via the one or more communication network interfaces 1110 (wired or wireless) and one or more communication networks, such as the Internet, other wide area networks, local area networks, metropolitan area networks, and so on.

The memory 1112 may also include a database 1120 which is configured to store various data and/or information necessary for operations of the server system 1100. For example, the database 1120 may store a plurality of speaker-independent keyword models for a plurality of keyword. In this configuration, the database 1120 may also store a list of a plurality of private keywords and a list of a plurality of non-private keywords.

It will be appreciated that the above identified modules or programs (i.e., sets of instructions) need not be implemented as separate software programs, procedures or modules, and thus various subsets of these modules may be combined or otherwise re-arranged in various embodiments. Furthermore, the memory 1112 may store additional modules and data structures not described above.

FIGS. 10 and 11 are intended more as functional descriptions of the various features of a client system and server system rather than a structural schematic of the embodiments described herein. In practice, and as recognized by those of ordinary skill in the art, items shown separately could be combined and some items could be separated. For example, some items shown separately in FIG. 11 could be implemented on a single server and single items could be implemented by one or more servers. Furthermore, the database 1120 may be implemented on a different set of servers or in other components of the server system 1100. The actual number of servers used to implement the server system 1100, and the allocation of features among them may vary from one implementation to another.

The techniques described herein are implemented by various means. For example, these techniques are implemented in hardware, firmware, software, or a combination thereof. It will be further appreciated that the various illustrative logical blocks, modules, circuits, and algorithm steps described in connection with the disclosure herein may be implemented as electronic hardware, computer software, or combinations of both are possible. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

If implemented in software, the methods, operations, and processes previously described may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein are applied to other variations without departing from the spirit or scope of the disclosure. Thus, the disclosure is not intended to be limited to the examples described herein but is to be accorded the widest scope consistent with the principles and novel features disclosed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method, performed by an electronic device, for obtaining a speaker-independent keyword model associated with a keyword designated by a user, the method comprising:

receiving at least one sample sound from the user indicative of the keyword;

generating a speaker-dependent keyword model associated with the keyword based on the at least one sample sound;

after generating the speaker-dependent keyword model associated with the keyword, sending, to a server, a request to obtain the speaker-independent keyword model associated with the keyword;

receiving, from the server, the speaker-independent keyword model; and selecting one of the speaker-dependent keyword model and the speaker-independent keyword model to detect the keyword based on a type of keyword or a function associated with the keyword.

2. The method of claim 1, further comprising:
determining whether the keyword comprises a private keyword; and
detecting the keyword from an input sound based on the speaker-dependent keyword model upon determining that the keyword comprises the private keyword.

3. The method of claim 1, further comprising:
determining whether the keyword comprises a non-private keyword; and
detecting the keyword from an input sound based on the speaker-independent keyword model upon determining that the keyword comprises the non-private keyword.

4. The method of claim 1, further comprising:
determining a security level of a function associated with the keyword; and
detecting the keyword from an input sound based on the speaker-independent keyword model upon determining that the security level of the function is below a predetermined security level.

5. The method of claim 1, further comprising:
determining a security level of a function associated with the keyword; and
detecting the keyword from an input sound based on the speaker-dependent keyword model upon determining that the security level of the function is greater than or equal to a predetermined security level.

6. The method of claim 1, further comprising:
receiving an input sound;
determining a confidence score for the keyword from the input sound based on the speaker-dependent keyword model;
detecting the keyword from the input sound upon determining that the confidence score is greater than or equal to a first threshold; and
updating a count indicative of a number of missed detections upon determining that the confidence score is greater than or equal to a second threshold and less than the first threshold.

7. The method of claim 6, further comprising detecting the keyword from a subsequent input sound based on the speaker-independent keyword model upon determining that the count is greater than or equal to a predetermined number.

8. The method of claim 1, further comprising:
receiving an input sound;
determining a keyword score for the input sound based on the speaker-dependent keyword model;
determining a non-keyword score for the input sound based on the speaker-independent keyword model; and
verifying the input sound as being indicative of the user based on the keyword score and the non-keyword score for the input sound.

9. The method of claim 1, wherein the request includes the keyword designated by the user, the at least one sample sound, at least one sound feature extracted from the at least one sample sound, and the speaker-dependent keyword model.

10. The method of claim 1, further comprising storing the speaker-dependent keyword model in a database.

11. The method of claim 1, wherein the server is a remote server.

12. An electronic device, comprising:
a sound sensor configured to receive at least one sample sound indicative of a keyword designated by a user;
a keyword model generator configured to generate a speaker-dependent keyword model associated with the keyword based on the at least one sample sound; and
a keyword model management unit configured to:
send a request to obtain a speaker-independent keyword model associated with the keyword to a server after the speaker-dependent keyword model associated with the keyword is generated;
receive the speaker-independent keyword model; and
select one of the speaker-dependent keyword model and the speaker-independent keyword model to detect the keyword based on a type of keyword or a function associated with the keyword.

13. The electronic device of claim 12, wherein the keyword model management unit is further configured to determine whether the keyword comprises a private keyword, and wherein the electronic device further comprises a keyword detection unit configured to detect the keyword from an input sound based on the speaker-dependent keyword model upon determining that the keyword comprises the private keyword.

14. The electronic device of claim 12, wherein the keyword model management unit is further configured to determine whether the keyword comprises a non-private keyword, and wherein the electronic device further comprises a keyword detection unit configured to detect the keyword from an input sound based on the speaker-independent keyword model upon determining that the keyword comprises the non-private keyword.

15. The electronic device of claim 12, wherein the keyword model management unit is further configured to determine a security level of a function associated with the keyword; and wherein the electronic device further comprises a keyword detection unit configured to detect the keyword from an input sound based on the speaker-independent keyword model upon determining that the security level of the function is below a predetermined security level.

16. The electronic device of claim 12, wherein the keyword model management unit is further configured to determine a security level of a function associated with the keyword, and wherein the electronic device further comprises a keyword detection unit configured to detect the keyword from an input sound based on the speaker-dependent keyword model upon determining that the security level of the function is greater than or equal to a predetermined security level.

17. The electronic device of claim 12, wherein the sound sensor is further configured to receive an input sound, and wherein the electronic device further comprises:
a keyword detection unit configured to:
determine a confidence score for the keyword from the input sound based on the speaker-dependent keyword model;
detect the keyword from the input sound upon determining that the confidence score is greater than or equal to a first threshold; and
update a count indicative of a number of missed detections upon determining that the confidence score is greater than or equal to a second threshold and less than the first threshold.

18. The electronic device of claim 17, wherein the keyword detection unit is configured to detect the keyword from a subsequent input sound based on the speaker-independent keyword model upon determining that the count is greater than or equal to a predetermined number.

19. The electronic device of claim 12, wherein the sound sensor is further configured to receive an input sound, and wherein the electronic device further comprises:
a keyword detection unit configured to:
determine a keyword score for the input sound based on the speaker-dependent keyword model;
determine a non-keyword score for the input sound based on the speaker-independent keyword model; and
verify the input sound as being indicative of the user based on the keyword score and the non-keyword score for the input sound.

20. The electronic device of claim 12, wherein the request includes the keyword designated by the user, the at least one sample sound, at least one sound feature extracted from the at least one sample sound, and the speaker-dependent keyword model of the keyword.

21. The electronic device of claim 12, wherein the keyword model management unit is further configured to store the speaker-dependent keyword model in a database.

22. The electronic device of claim 12, wherein the server is a remote server.

* * * * *